US007555445B2

(12) United States Patent
Moya et al.

(10) Patent No.: US 7,555,445 B2
(45) Date of Patent: Jun. 30, 2009

(54) NETWORK AUCTION SYSTEM AND METHOD

(76) Inventors: Jean-Guy Moya, 64 Hamilton Street, Toronto, Ontario (CA) M4M 2C8; Avrom Joshua H. Parker, 561 Indian Road, Toronto, Ontario (CA) M5P 2C3; Paul Walter Dinkel, 160 Bridge St. East, Belleville, Ontario (CA) K8N 1N1

( * ) Notice: Subject to any disclaimer, the term of this patent is extended or adjusted under 35 U.S.C. 154(b) by 622 days.

(21) Appl. No.: 11/064,090

(22) Filed: Feb. 24, 2005

(65) Prior Publication Data
US 2005/0197950 A1 Sep. 8, 2005

Related U.S. Application Data

(60) Provisional application No. 60/547,060, filed on Feb. 25, 2004.

(51) Int. Cl.
*G06Q 30/00* (2006.01)
*G06Q 40/00* (2006.01)
(52) U.S. Cl. .......................................... 705/26; 705/37
(58) Field of Classification Search ................... 705/26, 705/37
See application file for complete search history.

(56) References Cited

U.S. PATENT DOCUMENTS

| 5,890,138 | A | 3/1999 | Godin et al. | |
|---|---|---|---|---|
| 6,230,146 | B1 | 5/2001 | Alaia et al. | |
| 6,415,270 | B1 * | 7/2002 | Rackson et al. | ........... 705/36 R |
| 7,403,911 | B2 * | 7/2008 | Guler et al. | ................... 705/26 |
| 2002/0002524 | A1 * | 1/2002 | Kossovsky et al. | ........... 705/36 |
| 2004/0019552 | A1 * | 1/2004 | Tobin | ........................... 705/37 |
| 2004/0199471 | A1 * | 10/2004 | Hardjono | ..................... 705/50 |
| 2006/0184504 | A1 * | 8/2006 | Taylor | ........................... 707/1 |
| 2007/0276745 | A1 * | 11/2007 | Harinarayan et al. | .......... 705/37 |

FOREIGN PATENT DOCUMENTS

| CA | 2423105 A1 | 3/2002 |
|---|---|---|
| EP | 1220126 A2 | 7/2002 |
| JP | 07302287 A | 11/1995 |

(Continued)

OTHER PUBLICATIONS

Luce, E., "International Company News: Filipino State Bank in Public Share Offering," Financial Times, p. 28, Feb. 21, 1995.*
Anon., "Duma Adopted Amendments to the Law 'On Insolvency (Bankruptcy)' After the Third Hearings. Amendments Considerably Cushion Requirements for Admitting Bankruptcy of the Enterprises," Banks and Exchanges Weekly, p. 5, Mar. 1, 2000.*

(Continued)

*Primary Examiner*—Nicholas D Rosen
(74) *Attorney, Agent, or Firm*—Bereskin & Parr LLP.S.E.N.C.R.L., s.r.l.

(57) ABSTRACT

The present invention provides a computerized system and methods for conducting on-line auctions. One or more concurrent auctions for one or more lots of products or services may be conducted. A dynamic pricing mechanism allows bidders to view the price at which a lot is offered and to make a bid when the price is acceptable to the bidder. In some embodiments, the results of the auction of one lot affect the starting price, reserve price and other characteristics of auctions for subsequent lots. In some embodiments, the pricing of a lot may depend more generally on the demand for similar products. Multiple stage auctions with declining price and rising price aspects are also provided.

19 Claims, 17 Drawing Sheets

FOREIGN PATENT DOCUMENTS

| | | | |
|---|---|---|---|
| JP | 2001092901 A | * | 4/2001 |
| JP | 2003316975 A | | 11/2003 |
| KR | 2003003138 A | * | 1/2003 |
| WO | WO-0036533 A1 | * | 6/2000 |
| WO | WO 01/82025 A2 | | 11/2001 |
| WO | WO 01/97106 A2 | | 12/2001 |
| WO | WO-03/027806 A2 | * | 4/2003 |

OTHER PUBLICATIONS

Stern, G.M., "Rust Never Sleeps," CFO, The Magazine for Senior Financial Executives, vol. 16, No. 11, p. 87, Fall 2000.*

Harris, S., "Acquisition Awards—Army: BestBuy.gov," Governmetn Executive, vol. 33, No. 11, pp. 29-31, Aug. 2001.*

International Search Report, PCT/CA2005/00259, International Filing Date Feb. 23, 2005.

* cited by examiner

NETWORK AUCTION SYSTEM AND METHOD

FIELD OF THE INVENTION

The present invention relates to a system and method for auctioning one or more items, and is more particularly concerned with a system and method for dynamically pricing items for auction.

BACKGROUND AND SUMMARY

Computerized auction systems have become increasingly popular tools for organizations and individuals to exchange products and services. The growth in the popularity of computerized auction systems can be attributed to the fact that a large number of auction participants, namely offerors and bidders, can gain access to vast global markets via networks. The numerous auction systems operating on these networks offer bidders a convenient way to search, view and acquire a seemingly endless range of products and services.

The majority of network-based auction systems utilizes a "standard" or rising price auction model. In a standard auction system a single lot composed of one or more products or services is offered to potential bidders until the expiry of the auction period. The auction period may be pre-determined or terminated at the discretion of the offeror. During the auction period, potential bidders may opt to place one or more bids for the products or services. Each successive bid is displayed by the auction system to inform all of the bidders of the current high bid price. Upon the termination of the auction, the product or service being auctioned is sold to the bidder having the highest bid price or, alternatively, not sold if the reserve price has not been met.

Although commonly used, standard auction systems are impractical in many situations, such as when an offeror wishes to sell a large number of lots of products or services or when the products or services are perishable. Since most computerized standard auctions last for several days or even weeks, it may take an offeror months to sell off a large number lots of products or services. During this time period, perishable products or services may have spoiled or the demand may have waned.

Auction systems using the standard model are also inefficient from the perspective of a bidder. In order to successfully bid on a lot, a bidder must monitor the progression of competing bids over the full duration of the auction.

These concerns are addressed to some extent by a "reverse" or declining price auction model. In a declining price auction model, a lot or lots of similar products or services are offered at a high starting price. The price is decreased uniformly at regular intervals until a bid is placed whereby the lot is sold to the bidder. The successful bidder then has the option of purchasing one or more of the offered lots.

Auction systems using the declining price auction model are more commonly used by sophisticated offerors and bidders. While some applications of the declining price auction model over a network have successfully implemented uniform declining pricing, these applications fail to react to market conditions when setting the prices and values for a lot or lots of products and services, such as, for example, the starting price, possible reserve price and decline rate. When market demand for lots of products or services fluctuates, existing declining price auction systems do not adjust the prices and values for the current lot and/or subsequent lots to reflect changes in the market conditions. Under certain market conditions, such as in the presence of very high demand for a lot or lots of products or services, the true market value for the lot or lots may not be realized.

Additionally, auction systems using a declining price auction model are difficult to implement on diverse technologies because of the utilization of varied terminals, communication modes and operating systems. As a result, declining price auction systems over networks have rarely been used and often unsuccessfully.

Furthermore, dynamic pricing has been solely used in a declining price auction model. However, dynamic pricing could also be used in a rising price auction model. In a dynamic rising price auction, the offeror offers to purchase a lot or lots of products or services at a dynamically rising price. The price of the lots increases until a bidder is willing to sell or buy a lot or lots of products or services at the current price. Dynamic pricing may also be used in an auction that combines a declining price auction and a rising price auction or a rising price auction and a declining price auction.

Accordingly, the present invention provides a system and method for conducting one auction or more than one concurrent auctions of one or more lots of products or services. The present invention further provides a system and method for auctioning one or more lots of products or services using dynamic prices and values.

BRIEF DESCRIPTION OF THE DRAWINGS

For a better understanding of the present invention, and to show more clearly how it may be carried into effect, reference will now be made, by way of example, to the accompanying drawings which show preferred embodiments of the present invention, and in which.

DETAILED DESCRIPTION OF EXEMPLARY EMBODIMENTS OF THE INVENTION

Figure 1:
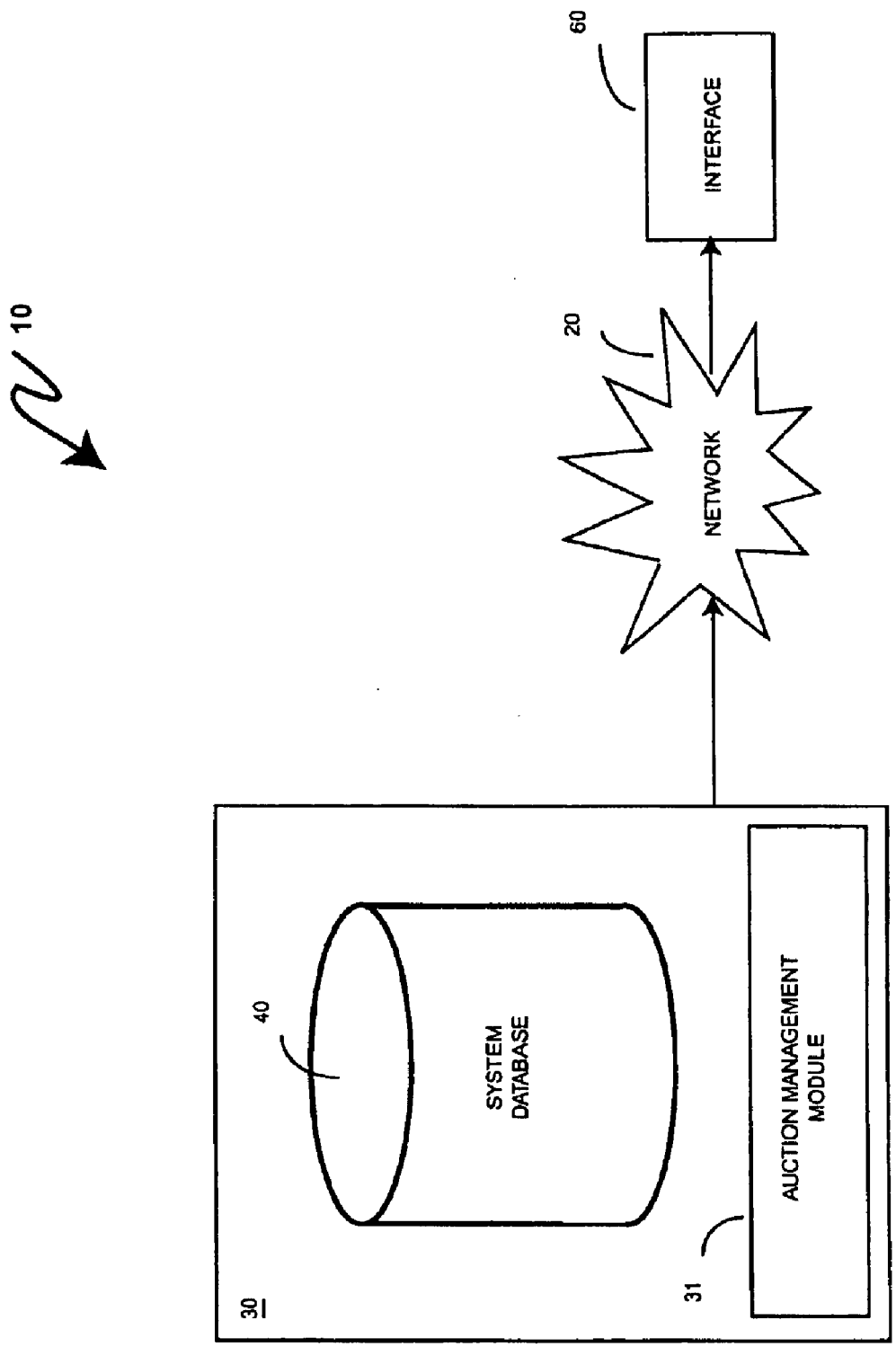
FIG. 1 is a schematic diagram illustrating a system in an embodiment of the present invention.

Reference is made to FIG. 1 which shows an auction system 10 for selling one or more lots singly or concurrently using a network 20 in accordance with a preferred embodiment of the present invention. The auction system 10 comprises an auction server 30, a system database 40, an auction management module 31, and at least one auction interface 60. The auction server 30, system database 40, auction management module 31 and auction interface 60 may communicate via network 20.

The auction items are organized into one or more lots to be sold using auction system 10. A lot may include a variety of products or services such as, for example, tangible or intangible items, travel and personal services, and financial instruments, including coupons and currencies. Any products or services may be auctioned using auction system 10.

During each auction a series of lots is sold to an auction participant. Each lot is sold is by auctioning it according to one of the methods described below. The sale of each lot is referred to herein as the auctioning of the lot or auction of the lot. The collective auctioning of all the lots is referred to as the auction.

In the embodiment of the present invention shown in FIG. 1, system database 40 and auction management module 31 reside on the auction server 30. Auction server 30 may operate on one or more computer systems.

Figure 2:
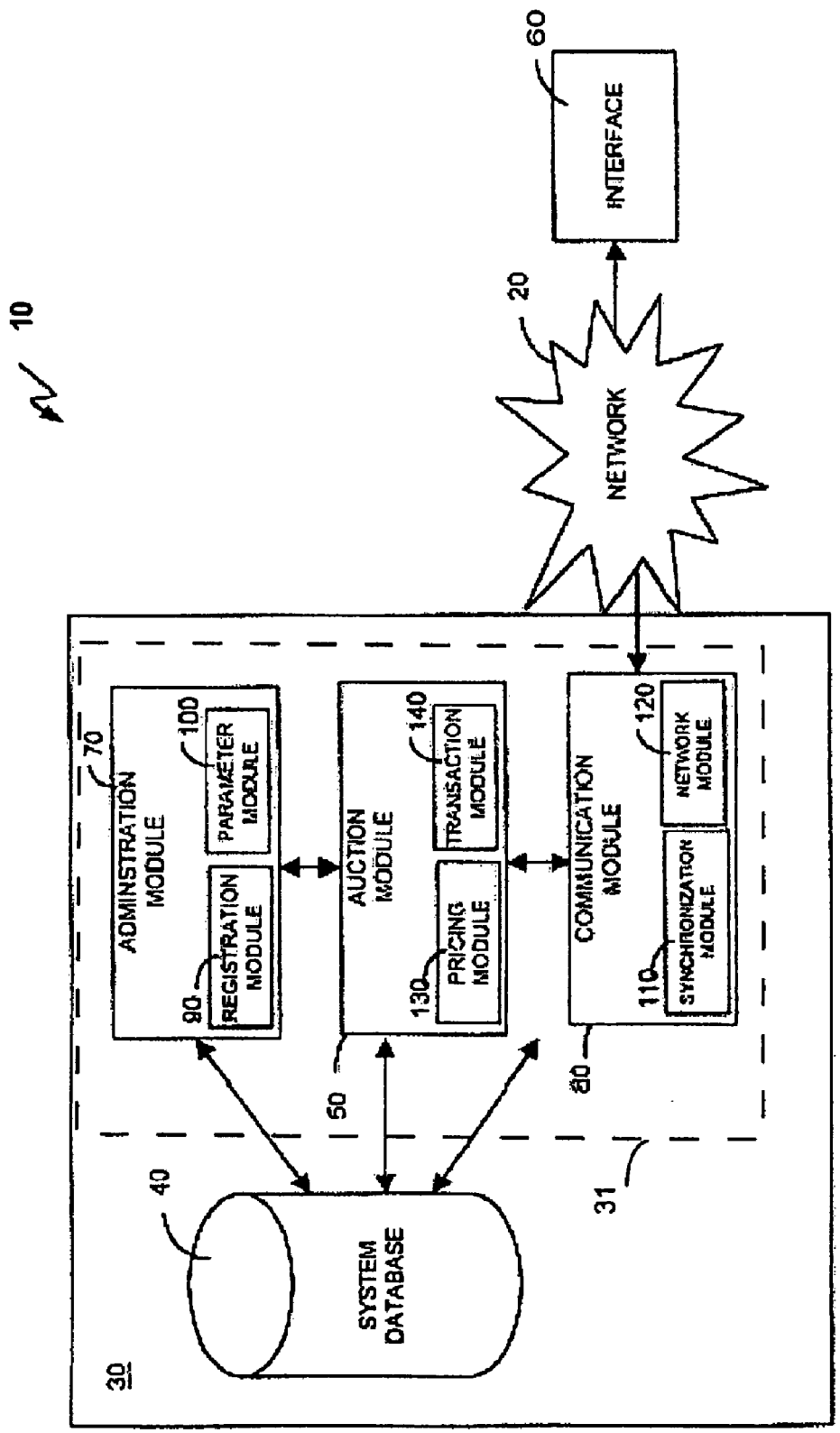
FIG. 2 is a schematic diagram illustrating the integrated components of a system in an embodiment of the present invention.

Referring to FIG. 2, the auction system 10 is adapted to manage the administration and operation of one or more auctions. Auction management module 31 includes an auction module 50, an administration module 70 and a communication module 80. Administration module 70, auction module 50 and communication module 80 are adapted to maintain and update data stored in system database 40. System database 40 is adapted for receiving and storing data such as, for example, information pertaining to the lots and auction items, the auction participants, synchronization data, network addresses and any other data utilized by system 10. In administration module 70 data is collected through a registration module 90 and a parameter module 100. Registration module 90 is configured to allow auction participants to create a personal profile. The personal profile may include, for example, the auction participant's name, contact information and payment or accounting data. An auction participant may be an offeror, a bidder, an auction administrator or any other person participating in any given auction on the auction system 10.

Parameter module 100 is configured to create an auction item profile for each of the lots to be auctioned by the offeror. The auction item profile may include a description of the lots and auction parameters. The auction parameters may include:

(i) the auction type declining, rising, declining-rising or rising-declining;

(ii) an auction starting date and time;

(iii) the duration of an auction or part of an auction, its completion date and time;

(iv) an indicator whether the offeror has the option of terminating the auction before the scheduled auction closing date and time;

(v) the number of lots of the auctions items to be auctioned;

(vi) a starting price—representing the initial price at which the lot is offered when the auction is commenced;

(vii) a reserve price—representing the lowest bid price that the offeror is willing to accept for the lot in a declining price auction. If the reserve price is reached before a bid is placed, the lot is not sold. The offeror may then remove the lot from the auction, recommence the auction or may choose to offer the lot for auction at a later time. If the offeror choose to offer the lot without a reserve price, the lot may be sold at any price above zero. In a rising price auction such as a "want ad" auction, the reserve price, called the maximum price, is the highest price the offeror is willing to pay. "Want ad" auctions always have maximum price set;

(viii) one or more spread factors—the auction parameters may be adjusted to reflect the outcomes in any preceding auctions of lots and to react to market conditions. A spread factor may be used to generate a starting price, a reserve price or to modify other auction parameters. A spread factor may be based on the bid price or reserve price in one or more preceding or concurrent auctions or it may be defined by a linear, exponential or any other mathematical function or numerical series. The spread factor may also take into account various internal or external factors such as the number of auction participants, past auctions results, the fluctuations of external values such as stock, bond, commodity or currency indices, the weather or any fixed or variable value made available by the parameter module. For example, the starting price in a pending auction of a lot may be generated by the auction system 10 by increasing or decreasing the successful bid price or the starting price in a previous completed or terminated auction by a spread factor. If the bid price was near the reserve price when the auction was completed, the starting price in the pending auction will likely be less than the starting price in the preceding auction. Conversely, if the bid was submitted shortly after the commencement of the auction, the application of the spread factor to the bid price will likely generate a starting price for the pending auction that is greater than or at least equal to the starting price in the preceding auction. If more than one declining auctions are run concurrently the new starting price will typically be greater than or equal to the current price of any concurrent auctions. If more than one rising auction are run concurrently the new starting price will typically be lesser than or equal to the current price of any concurrent auctions;

(ix) an auction price change factor—the amount by which the starting price of the auction is dynamically increased or decreased may be specified using the auction price change factor. As an auction progresses, the auction price is incrementally or decrementally changed to generate an adjusted auction price or a current price. The change factor may be pre-defined by the offeror or a default change factor may be specified by the administration module 70. Furthermore, the change factor may be constant or may be variable, it may be defined by a linear, exponential or any other mathematical function or numerical series or by any other mechanism. The auction price change factor may also take into account various internal or external factors such as the number of auction participants, past auctions results, the fluctuations of external values such as stock, bond, commodity or currency indices, the weather or any fixed or variable value made available by the parameter module.

For example, a change factor that reduces the auction price by only a small amount would afford the bidders more time to consider the lot before submitting a bid. As a result, the bidders may withhold the submission of bids until the auction price reaches their desired bid price. Alternatively, if the auction price reduces by large amounts the interested bidders may act spontaneously and submit their bids early.

(x) a speed of change parameter—may operate in conjunction with the auction price change factor to define the rate at which the auction price is adjusted. For example, until a bid is received or the reserve has been met the offeror may opt to adjust the current price every second, every 30 seconds, every hour or any other suitable interval depending on the product and the offeror's strategy.

(xi) Parameters may be also be set for the general operation of an auction. For example, a parameter may define how many times a lot is allowed to reach the reserve price without receiving a bid before a new lot is offered, another parameter may define the maximum number of participants in an auction, another parameter may define if a successful bidder can elect to buy more than one lot at the successful bid price or can only buy the lot currently auctioned. Other parameters may apply only to some categories of lots. For example highly perishable products or services, such as travel tickets or vouchers, may have an acceleration parameter which speeds up the auctions as the date and time of departure gets closer. Many other parameters may be set by the offeror or the auction system 10. Any parameter may be set by either the offeror or the auction system 10.

The parameter module 100 may be configured to permit the offeror to adjust the original auction parameters during an active auction. For example, if the demand or market conditions for a group of lots are waning, the offeror may decide to reduce the starting price or reserve price, or have no reserve price, to encourage the submission of bids. Furthermore the offeror may choose and exercise the reserve price in real time during the auction. The offeror may also choose to set the starting price or modify the current price in real time during the auction. This may make it easier for the offeror to adjust his offering to the market. The ability to adjust the starting price, the current price, the reserve price and the auction parameters during an auction may be particularly useful to offerors auctioning perishable products and services, such as last minute airline tickets, television advertising spots or fresh food.

Additionally, each auction parameter may have static or dynamic characteristics as defined by the offeror. A statically-defined pricing parameter would remain constant throughout any given auction until amended by the offeror. For instance, if the offeror selected a static starting price for a group of lots, the same opening starting price would be applied to all active and pending auctions of the offeror's lots in this group.

An auction parameter for a group of lots that is dynamically defined by the offeror may fluctuate during any given active or pending auction. For example, the offeror may choose to dynamically-define the reserve price so that if the reserve price is reached in three successive auctions without a bid being placed, an adjusted reserve price (i.e. a reduced reserve price) would be generated by the auction system 10. An offeror may also choose to use a dynamic reserve price if she/he is unsure of the market appeal of the lot. If the reserve price is set higher than the market value, as determined by the bidders, auction system 10 would dynamically adjust the reserve price until the bidders are motivated to place bids.

The reserve price may be dynamically defined using a dynamic reserve factor. The dynamic reserve factor may, for example, be a multiple or mathematical formula that can be used by the pricing module 50 to generate an adjusted reserve price based on the reserve price in a preceding auction. For instance the dynamic reserve factor may be generated using the historical auction data stored in system database 40 from concurrent and completed auctions for identical or comparable lots.

Referring to FIG. 2, the communication module 80 may comprise a synchronization module 110 and a network module 120 for sending and receiving data to and from the offerors and bidders through network 20. The data transmitted by communication module 80 to the offerors and bidders through network 20 may be in any form, such as text, electronic mail messages, pages, video, sounds or images. Preferably, the data is text-based for quick transmission including HTML or XML based documents, for example, but it may be in any other suitable formats. As will be discussed with reference to FIGS. 3 and 4, network 20 may be a unicast (point-to-point) or broadcast (simultaneously to all users) network. Alternatively, network 20 may be a multicast (point-to-multipoint) network or any other suitable communication network presently available or that is developed in the future.

Auction module 50 is adapted to communicate with auction server 30 and system database 40 to monitor the auction prices and bid prices in any given auction of a lot. Auction module 50 comprises a pricing module 130 and transaction module 140. The pricing module 130 is configured to generate at least one auction price for each of the lots being auctioned based on the auction parameters obtained by the parameter module 100. The auction price may include, for example, the starting price, the reserve price, the change factor and the speed of change.

The transaction module 140 is configured to communicate with the communication module 80 to receive the bids submitted by the auction participants. The particulars of the submitted bids, such as the identity of the auction participant and the bid price, may be stored in the system database 40 by the transaction module 140. The transaction module 140 and pricing module 130 may also be configured to validate the submitted bids in any given auction. Bid validation is useful to ensure that the bidder, for example, placing the first successful qualifying bid is sold the lot.

The server clock 150 (FIG. 2 and FIG. 3) is a representation of the "real time" of the auction. The real time of the auction may be determined using various Internet-based services, such as, for example, the United States National Institute of Standards and Technology Clock or the World Time Server Clock. Time is calculated by referring to the server clock 150. The difference between the time when the communication module 80 sends data to an auction interface 60 and the time when the auction interface 60 receives the data is the network propagation delay or "lag time" for that bidder. The existence of lag times is problematic because it may result in a first bidder receiving the auction data earlier than a second bidder having a longer lag time. Consequently, the second bidder may be disinclined to participate in an auction in which there is imperfect information between each of the bidders.

Synchronization module 110 is configured to reduce the occurrence of imperfect information by organizing the bidders according to their respective lag times or by providing the pricing module with necessary data to adjust the value of the parameters sent to a particular auction interface 60. In an auction comprising bidders having different lag times, communication module 80 may stagger the times at which the data is sent in accordance with synchronization module 110 to compensate for each bidders' respective lag time. This enables the bidders to make informed bidding decisions based on the data received from auction system 10 at substantially the same time. Preferably, synchronization module 110 organizes the bidders in a queue based on each bidders' respective lag time. Most preferably, the queue is organized in reverse chronological order so that a bidder having a longer lag time would be sent the auction data prior to a bidder having a shorter lag time. Alternatively, the synchronization module may communicate the lag time of each user to the pricing module which may calculate adjusted data for each user in accordance with the lag time and the time of the transmission of the data. This may be particularly suited to auctions where the number of auction participants is large enough to necessitate the spreading of the transmissions beyond the delays needed to compensate for lag time.

Figure 3:
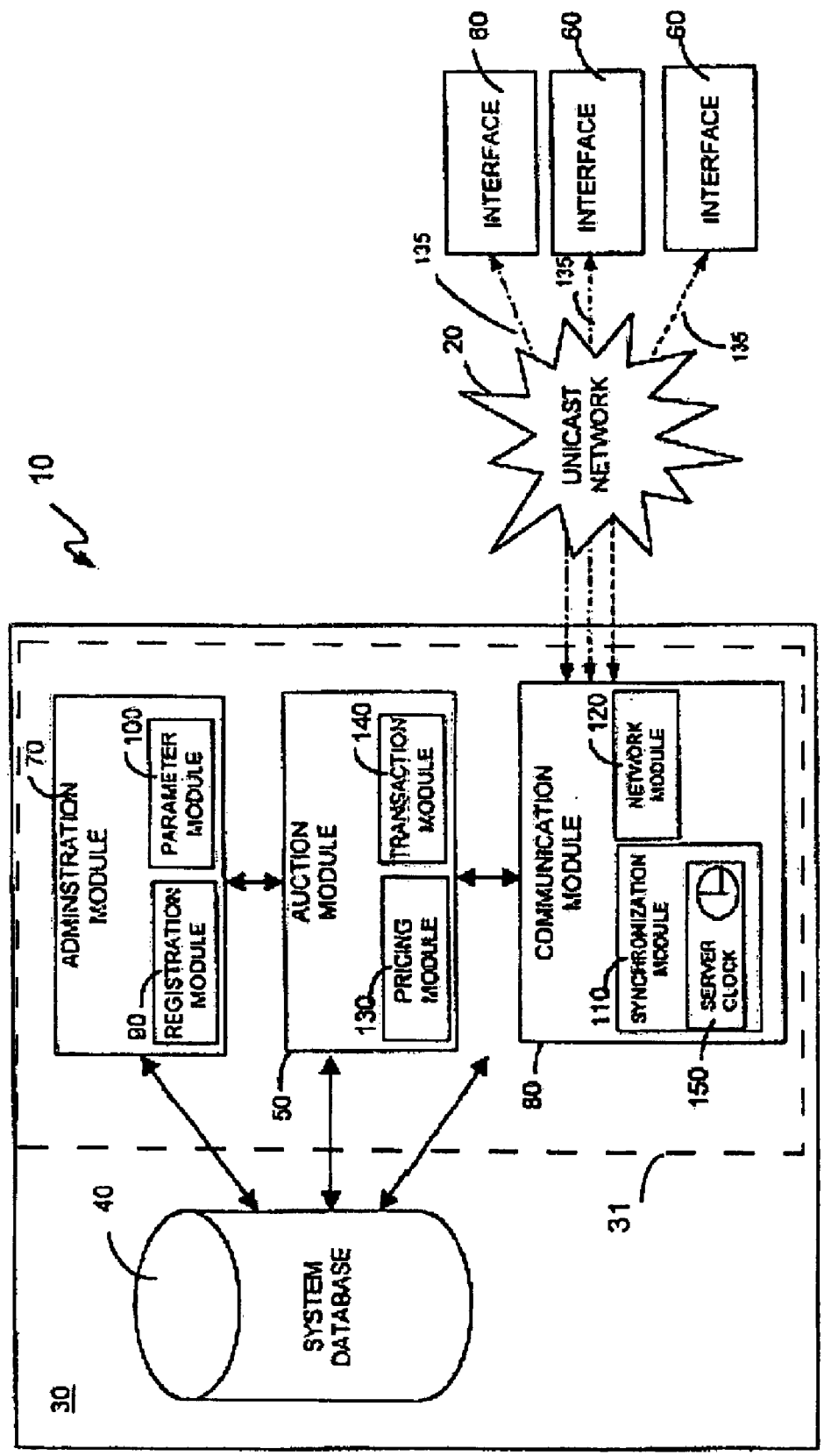
FIG. 3 is a schematic diagram illustrating a system comprising a unicast network in an embodiment of the present invention.

Referring now to FIG. 3, an embodiment of the present invention is shown where auction system 10 communicates through a unicast network. An example of a unicast network is the Internet. The communication module 80 is adapted to communicate directly with each offeror and bidder using the synchronization module 110 and network module 120. The two-way communication between the communication module 80 and the auction interfaces 60 is indicated by data flow lines 135. Using the server clock 150, the synchronization module 110 computes the response times of the one or more bidders participating in any given auction to estimate the lag time of each auction participant. The synchronization module 110 is configured to send the auction data, including the auction prices and parameters, so that it is displayed by the auction interfaces 60 of the auction participants at substantially the same time. Alternatively, to compensate for the lag time variations the data may be adjusted for each auction participant to ensure that the auction interfaces display the same auction data at substantially the same time.

The network module 120 communicates the auction data from the auction server 30, the system database 40, and/or the auction module 50, to the offeror and bidders through the network 20. Typically, the auction data is sent by the network module 120 to the auction participants upon the occurrence of one or more "update events". The frequency of the update events may be specified by the offeror using the parameter module 100. For example, the updated auction data, such as the adjusted auction price, may be sent to the bidders every thirty seconds. This thirty second time period represents the "sleep time" between update events. If the offeror does not specify a sleep time when creating the auction item profile, the administration module 70 may select a default sleep time.

An update event may occur prior to the expiration of the sleep time if a bid is submitted by one or more of the bidders. The bid or bids may then be validated by the auction module 50 to determine whether the bid price corresponds to the auction price at the time the bid was received. In a declining price auction a bid is valid when it is greater than or equal to the price of the lot as calculated by the server for the "real time", as determined by the server clock 150, when the bid was received. In a rising price auction a bid is valid when it is lesser than or equal to the price of the lot as calculated by the server for the "real time", as determined by the server clock 150, when the bid was received. Invalid bids may be caused by a variety of factors such as deficient bidder's hardware or software, malicious intent or other unforeseen causes. The auction module 50 may also ascertain that the bidder is authorized to bid. If the bid is determined to be valid, the communication module 80 will update the auction participants to indicate that a successful qualifying bid has been submitted, thereby completing the auction for the lot. If a bidder submits an invalid bid, the communication module 80 may only update that bidder of the bid rejection. The auction would then continue and the bidders would be updated upon the occurrence of the next update event.

An update event may also occur if the reserve price for the one or more lots is reached. When no successful bids have been submitted for a lot, the communication module 80 will notify the auction participants that the reserve price was reached. The auction may then be terminated and recommenced at a dynamically adjusted starting price.

An update event may also occur if the current price is modified because of internal or external factors or because the offeror modified the current price in real time. For example, such factors may include the outcome of other sales of goods similar to the lots being auctioned. For example, if an offeror is selling a particular type of red wine and notes that prices for red wines are generally rising, the offeror may raise the current price for the red wine the offeror is selling, and may also change the auction parameters for his auctions. This operation may also be automated by the auction module.

Other functions may be implemented by communication module 80 to send and receive data to and from the offerors and bidders. For example, communication module 80 may be adapted to send and receive the data at various times in between update events upon request by the offeror and/or bidders.

Alternatively, the auction system 10 may be adapted to send the auction parameters collected by parameter module 100 to an engine module (such as a local application on the auction interfaces 60) within the interfaces 60 of each of the offeror and bidders. The engine module of the interface 60 may then utilize the pricing parameters to generate the one or more auction prices for the one or more lots automatically. For example, the auction parameters may include the starting price, the spread amount, the speed of change and a time reference. The auction interfaces 60 would display the starting price in accordance with the auction prices generated by the engine module. The starting price would then be decreased or increased automatically on each bidder's interface 60 until a successful bid is submitted or until another update event occurs. Providing the bidders' interfaces with the auction parameters would minimize the processing and communication time by the auction system 10. When the auction parameters are operated by the auction interfaces 60, update events may be scheduled by the auction server 30 to monitor and maximize the synchronicity between the various auction interfaces 60, and thereby minimize the impact of the diverse hardware and software technologies utilized by the various auction interfaces 60.

In a unicast network, the auction interface 60 is preferably Internet-based and may be integrated into a web browser in communication with auction server 30, system database 40 and/or auction module 50. The web browser may be used or adapted to display information generated by the auction server 30, system database 40 and/or auction module 50 thereby acting as the auction interface 60.

Figure 4:
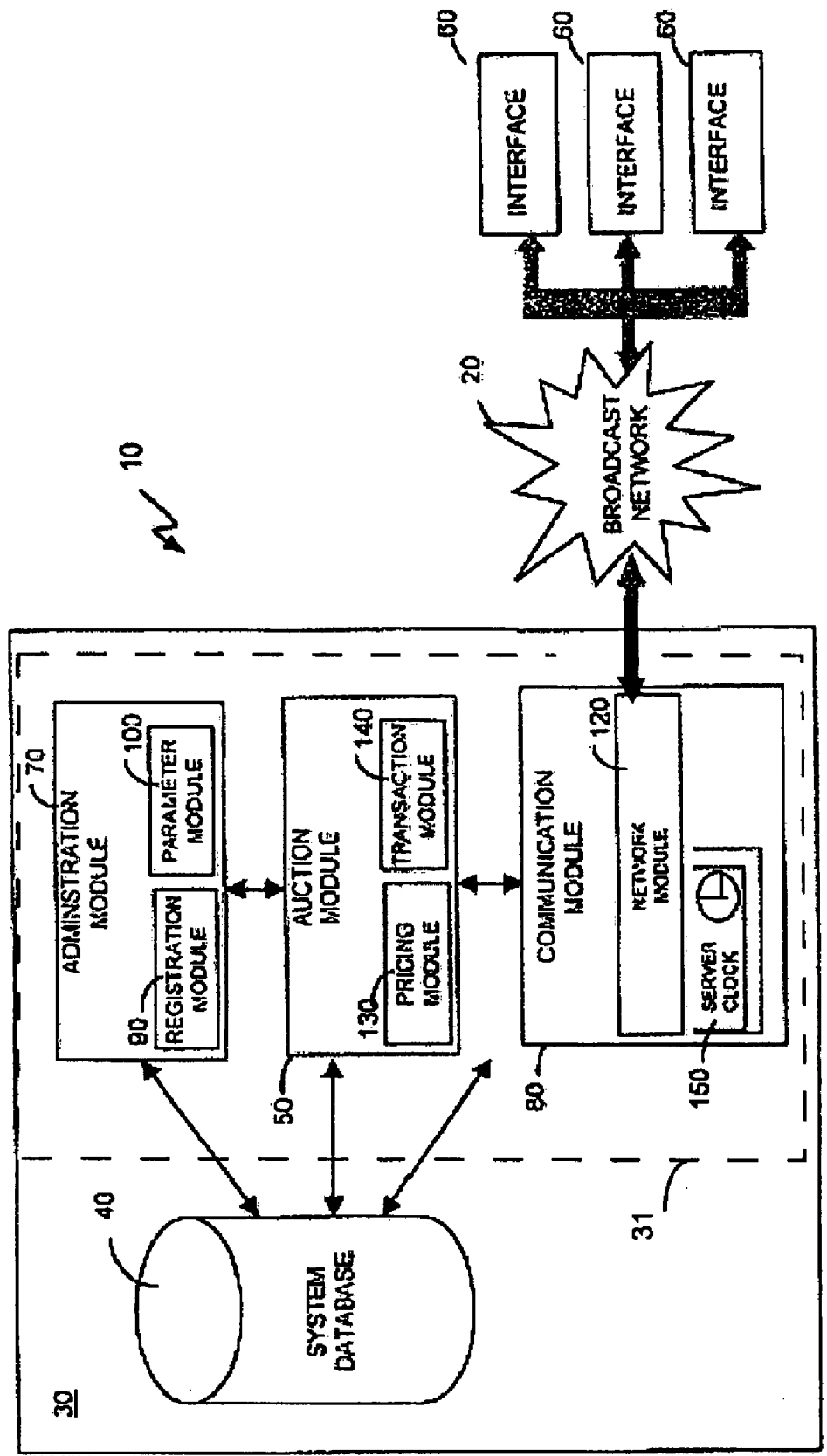
FIG. 4 is a schematic diagram illustrating a system comprising a broadcast network in an embodiment of the present invention.

Referring now to FIG. 4, another embodiment of the present invention is shown where auction system 10 communicates through a broadcast network. A cable television network is an example of a broadcast network. The broadcast network may also be any satellite, antennae or cable-based network. When using a broadcast network, the network 120 of the auction system 10 sends or broadcasts the auction data continuously to each of the interfaces 60. Given that the lag times associated with broadcast networks are considerably smaller and are more uniform than typical unicast networks, the synchronization module 110 may optionally not be used in a broadcast network-based auction system 10. It is understood that a synchronization module 110 may be included in the design of a broadcast network based auction system if lag times are experienced, for example, between bidders using satellite networks and cable networks. It is also understood that the server clock 150 and the definition of a "real time" are used to measure and/or calculate lot prices and other parameters such as auction duration.

In this embodiment, the auction interface 60 may be a television set that is compatible with the broadcast network. Such a television may be network enabled by adding a set-top box that is coupled to the broadcast network, or network communication hardware may be integrated with the television. For example, a cable or satellite television system may be capable of two-way communications and may include a set-top box or integrated hardware to allow a television to communicate with cable or satellite television system. Optionally, an alternate route such as a dial-up connection may be utilized for bidding. For example, information received by a satellite television set-top box may be received by satellite, but information communicated from the set-top box to the auction system 10 may be transmitted by ground based wired or wireless communication, such as a telephone system based dial-up or DSL network access service.

In a unicast, broadcast, multicast or any other network, the auction interface 60 is adapted to permit auction participants to view one or more lots at a time, to view auction item profiles, to offer lots for sale, and to submit bids. While auction interface 60 may permit auction participants to submit bids directly, alternatively bids may be submitted through a different network interface such as a telephone or may be set and stored in advance by auction participants as pre-registered bids. The interface 60 may be any display or mobile device adapted to receive and send data from and to the communication module 80. The mobile device may include, for example, monitors, displays screens, personal digital assistants (PDAs), cellular telephones, pagers, portable electronic mail messaging or other messaging devices, handheld organizers, portable computing devices or other devices. Other functions such as the creation, modification and deletion of auction participant profile, of auction items as well as the many administrative functions needed for the functioning of the auction system may be done through different network interfaces. For example, auction participants may take part in the auction through a broadcast network such as cable television while the administrative functions may be perform through the Internet.

Figure 5:
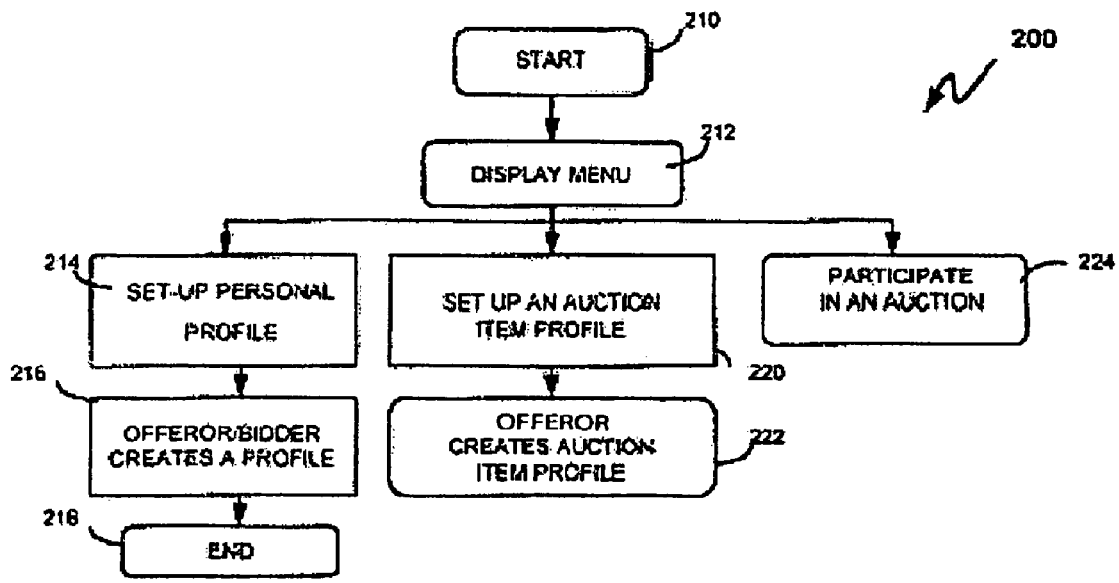
FIG. 5 is a flowchart illustrating steps in a method auctioning one or more lots.

Reference is now made to FIG. 5 in which the steps in an embodiment of a method for auctioning one or more lots are shown generally as 200, and commence at step 210. At step 212, a menu is displayed to the auction participant. The auction participant may select a task to perform from those displayed in the menu. If at step 214, the auction participant has requested that a personal profile be set up, then a new personal profile will be created at step 216. The step of creating a personal profile terminates at step 218. If, at step 220, the auction participant has requested that an auction item profile be set up for an item for which an auction item profile has not yet been created, then a new profile will be created at step 222. At step 214 and 220, the auction system 10 may be adapted to permit an auction participant to amend or delete previously created personal profile or auction item profiles. If at step 224, the auction participant has requested to participate in an active or pending auction or to view completed auction data, then the auction participant would select the one or more auctions.

Other means of providing auction participants with access to the auction system may be implemented as known in the art. Furthermore, the auction system 10 may include a login procedure which would allow an auction participant to access the system 10 using a user name and password, for example. The login procedure may be implemented at various steps throughout the method, such as, for example, when a bidder wishes to participate in an auction, when a bidder submits a bid or when an offeror creates an auction item profile.

During an active or pending auction the offeror may amend the auction parameters to motivate bidders to place bids. The offeror may participate in an active auction to override previously set parameters. For example, the offeror may reduce a previously set reserve price to increase the likelihood that a bid will be placed or the offeror may modify the current price to reflect internal or external factors. Enabling the offeror to participate directly in any given auction, including an active auction, may have a desirable effect on the bidding psychology and the acclivity of the bid prices for the lots.

In an alternate embodiment, steps 220 and 222 may be utilized by an offeror to place a "want ad" on the auction system 10 by creating an auction item profile. As will be illustrated with reference to FIG. 13, the offeror would provide a description and the auction parameters for the lot that they wish to obtain. They may offer to purchase, lease or rent one or more tangible or intangible items. In a "want ad" auction, the offeror would specify the maximum price that they would be willing to pay for the lot, rather than a reserve price. During an active auction willing bidders would be permitted to submit bids to supply the desired lot to the offeror.

Figure 6:
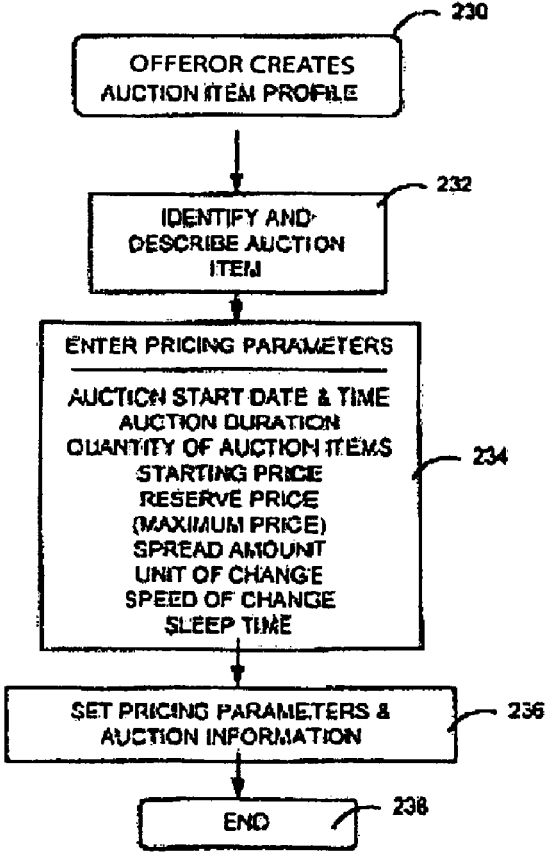
FIG. 6 is a flowchart illustrating steps to be performed in constructing an auction item profile in an embodiment of the present invention.

The steps to be performed in creating an auction item profile at step 222 of FIG. 5 are initiated at step 230 of FIG. 6. At step 232, the offeror identifies and describes the one or more lots to be auctioned. Information that may typically be obtained in this step includes, for example, an auction item category, the condition of the auction item, a description of the auction item, images and videos, links to further information, availability and a name identifying the offeror. The selection of an auction item category and/or a description of the condition of the auction item may, for example, be accomplished by selecting from a drop-down list or a scroll menu of pre-set choices.

At step 234, the offeror enters the auction parameters for the one or more auction items identified at step 232. The auction system 10 may display a list of different pricing parameters from which the offeror may select. Any method known in the art may be utilized to display the auction parameters to the offeror. In a preferred embodiment of the invention, the auction parameters may be selected from a pre-set bundle that correspond to specific or common types of auction items. For example, an offeror auctioning a digital camera could opt to select a pre-set bundle of pricing parameters that have been compiled based on the auction prices for similar or comparable digital cameras. Alternatively, the pre-set bundles of auction parameters may be designed to correspond with various auction strategies meant to influence the bidding psychology of the bidders. For example, a risk adverse offeror may select a conservative pre-set bundle of pricing parameters in which the reserve price is static and the auction speed is slow. Alternatively, an anxious offeror may wish to dispense with the one or more lots quickly. Accordingly, a pre-set bundle of auction parameters may be selected wherein the starting and reserve prices are dynamically-defined and the auction speed is fast. Each of the pre-set bundles may be adjusted by the offeror to tailor the auction parameters to the specific requirements of the offeror.

Once the auction parameters have been selected, the offeror may confirm and set the auction parameters for the one or more lots at step 236. The steps to be performed in creating an auction item profile are completed step 238.

Figure 7:
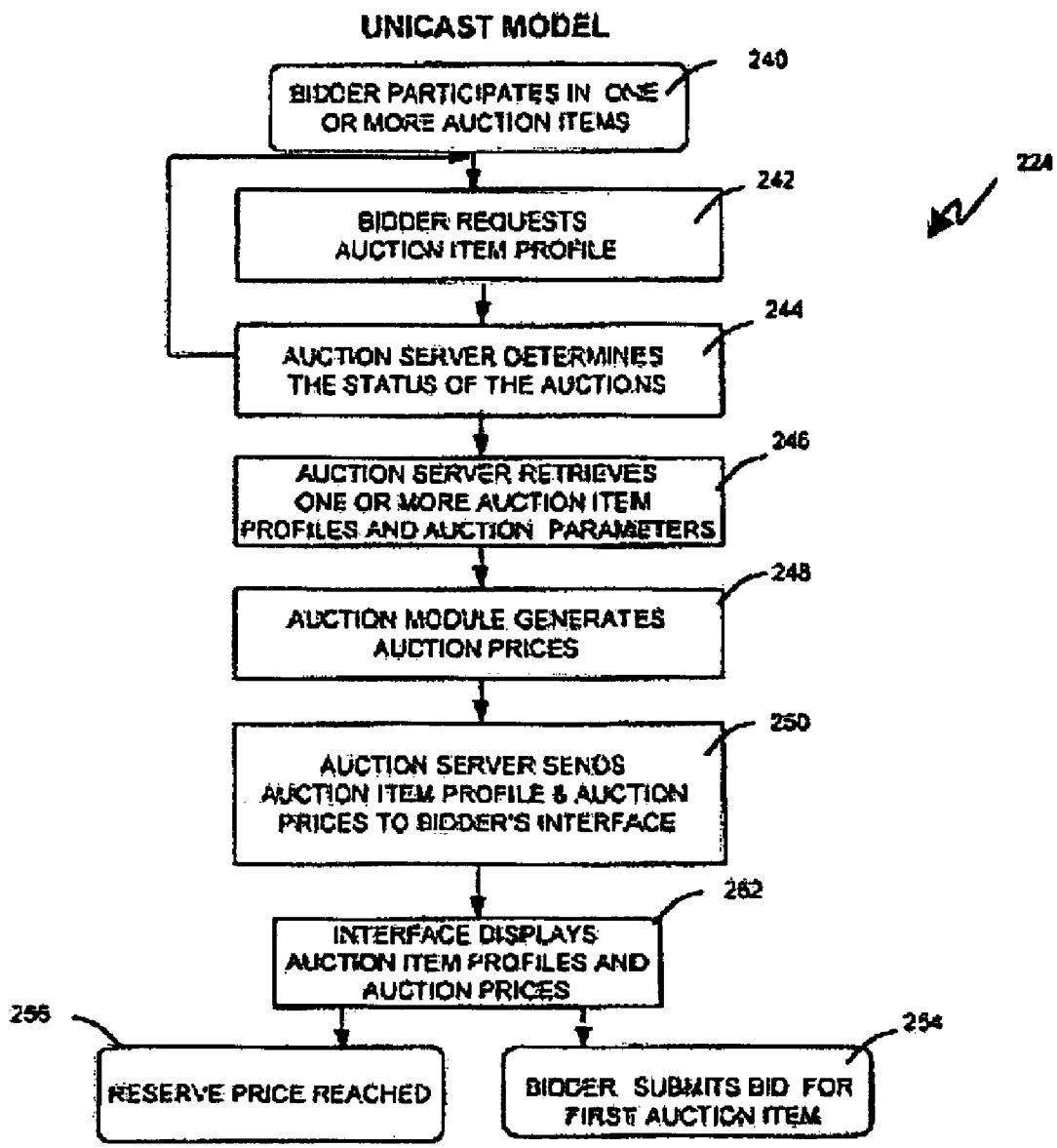
FIG. 7 is a flowchart illustrating steps to be performed in auctioning one or more lots in an embodiment of the present invention utilizing a unicast network.
Figure 8:
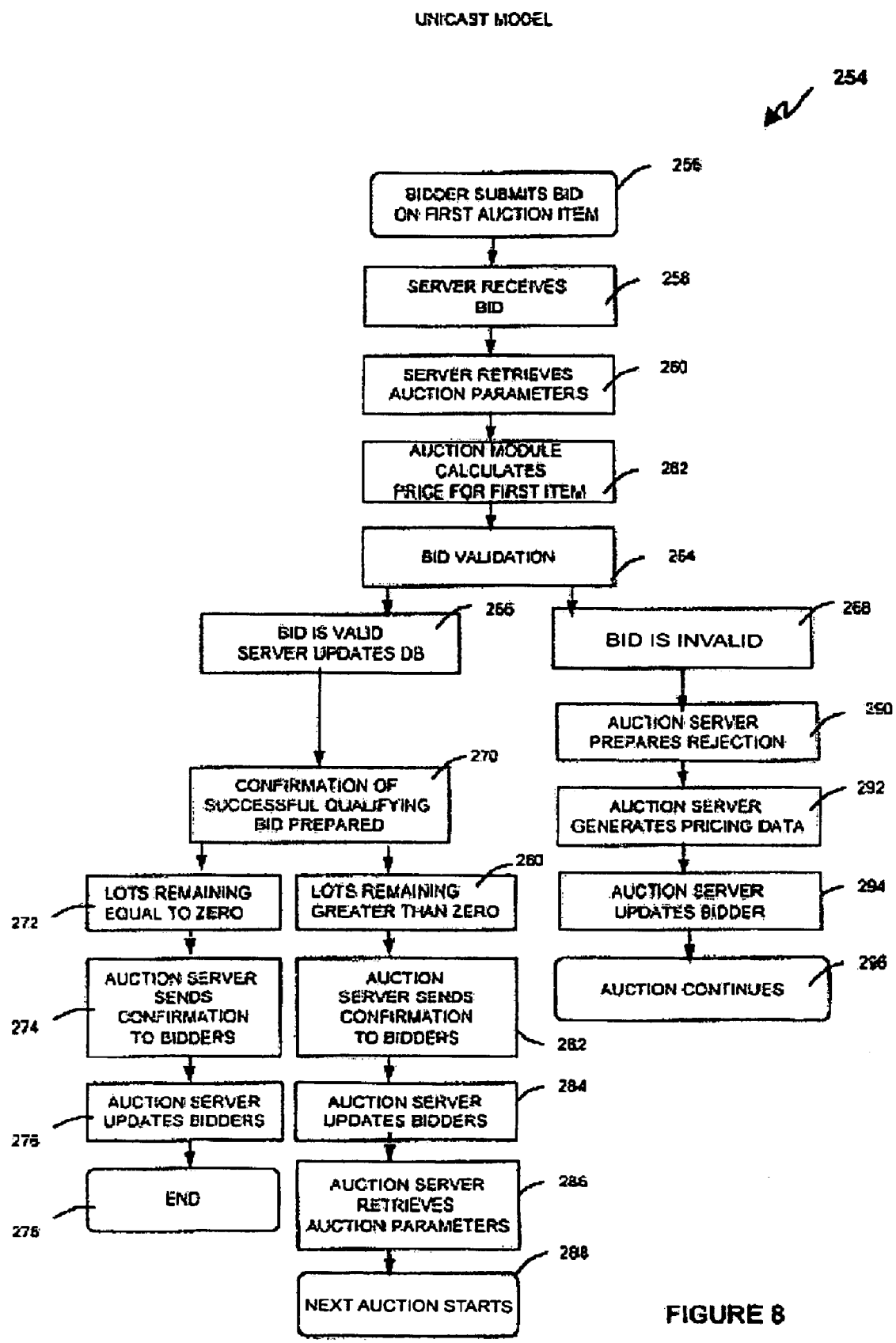
FIG. 8 is a flowchart illustrating steps to be performed in validating an auction participant's bid in an embodiment of the present invention utilizing a unicast network.
Figure 9:
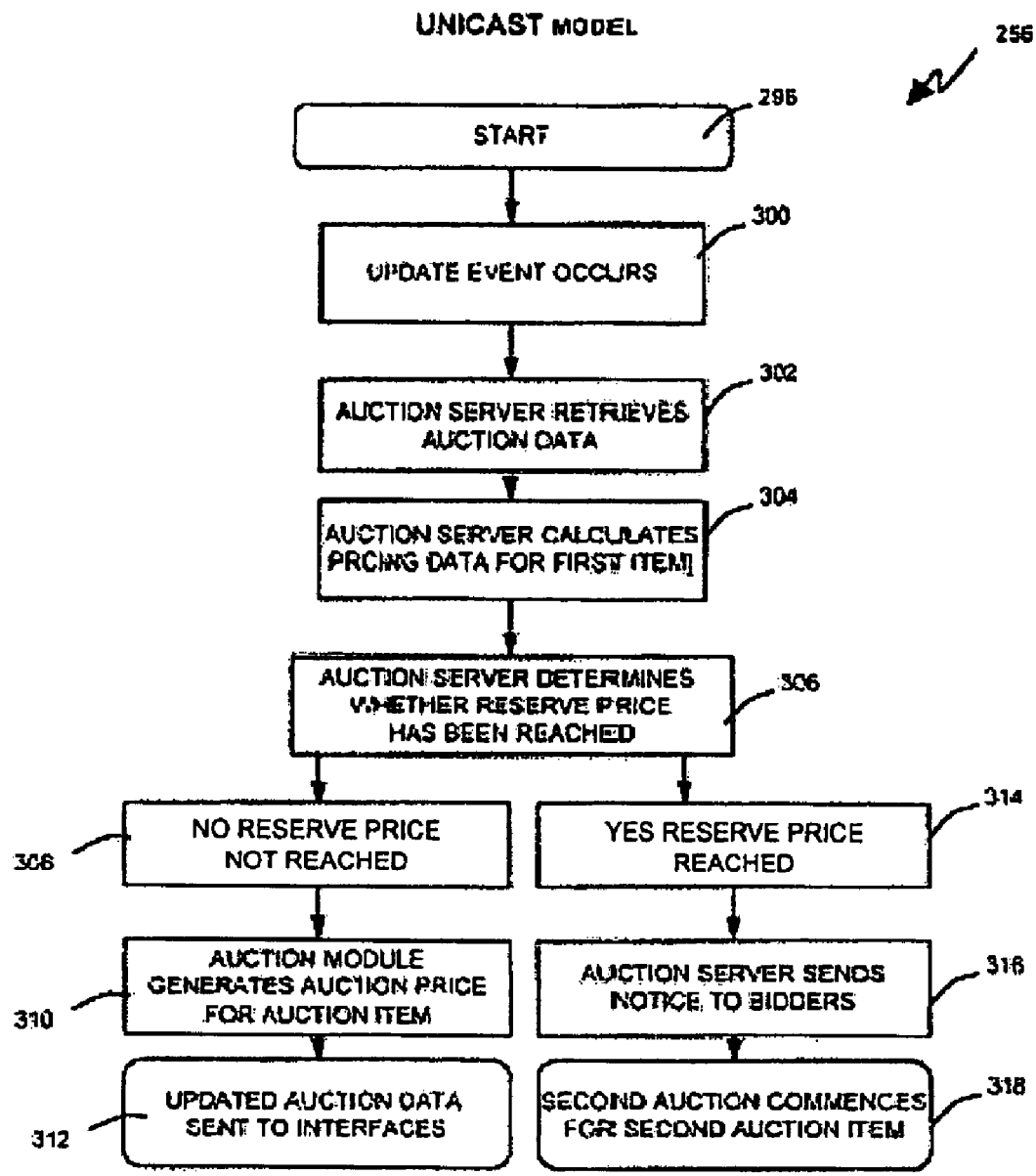
FIG. 9 is a flowchart illustrating steps to be performed in an auction when the reserve price is reached in an embodiment of the present invention utilizing a unicast network.

Reference is made to FIGS. 7, 8 and 9 which illustrate a method for auctioning one or more lots via a unicast network in accordance with a preferred embodiment of the present invention.

Reference is now made to FIG. 7 which illustrates the method at step 224 of FIG. 5 for participating in one or more auctions through a unicast network. The method commences at step 240 of FIG. 7. At step 242 the bidder requests the auction item profiles for one or more active, pending or completed auctions. At step 244, the status of the selected auctions is determined by the auction server. If the auction is active, the method proceeds to step 246. If the auction is pending the bidder may, for example, be provided with the auction item profile, starting price, the reserve price, and the starting date and time and/or given the option of requesting a different auction item profile. If the auction has been completed, the auction participant may be offered to view historical data about the auction.

At step 246, the auction system 10 retrieves the requested auction item profiles for the one or more auctions that are active. The method proceeds to step 248 where the auction module 50 generates the auction current prices and the current values of the dynamic parameters for the one or more lots in accordance with the corresponding stored auction parameters.

Method 224 next proceeds to step 250. At step 250, the communication module 80 of auction server 30 sends the auction item profile and auction parameters to each of the requesting bidders. The bidder's auction interface may, for example, be provided with the auction item profile, the starting price, the reserve price, the rate of change and the speed of change. At step 252, the auction data is received and displayed on the bidder's auction interface. It will be understood that only portions of the auction item profiles, such as, for example, the auction item description, the starting price, the number of lots for sale and the quantity sold may be displayed on the auction interface 60. Additionally, the reserve price may also be displayed to the bidders to influence the submission of bids. The auction data will be updated and sent to bidders until either a successful qualifying bid is submitted or the reserve price for the one or more lots is reached. If one or more bids have been submitted, method 224 proceeds to step 254. Otherwise, the auction will continue until the reserve price is reached at step 256.

Reference is now made to FIG. 8 which illustrates the method of step 254 of FIG. 7 for validating a bid submission. The method commences at step 256 of FIG. 8. At step 258 the one or more bids are received by the auction system 10. In an alternative embodiment of the present invention, following the receipt of a first bid, the auction system 10 may be adapted to pause for a selected time period to permit bids which were delayed due to lag times to be received. All bids received prior to the close of the selected time period represent "qualifying" bids.

The method 254 next proceeds to step 260. In step 260, auction module 50 retrieves the auction parameters for the lot and, at step 262, generates the current auction price at the time the bid was received by the communication module 80, the bid time, the auction price at bid time, for the lot. Alternatively, the auction module 50 may generate a lag time adjusted current auction price at the time the bid was submitted by the bidder through their auction interface 60. In this alternative the bid time would be the lag time adjusted submission time. The lag time between the submission and the reception of the bid would be determined by synchronization module 110. This adjustment for lag time can only be made in an auction system that includes a synchronization module 110.

At step 264, the auction module 50 validates the first bid received using the auction price generated at step 262. For a declining price auction if the bid price is greater than or equal to the auction price at bid time the bid is deemed to be valid and the method 254 proceeds to step 266. In the case of a rising price auction ("want ad"), a valid bid must be lesser than or equal to the auction price. If the bid is deemed invalid, the method proceeds to step 268.

At step 266, auction module 50 updates and stores the auction data for the successful qualifying bid, including the bid price, the bidder's personal profile, the number of lots bid for, the number of lots remaining and the auction item profile, in system database 40. At step 270, the administration module 70 prepares a notice confirming that a successful qualifying bid was submitted. If the number of lots of the auction item remaining is equal to zero at step 272, the communication module 80 sends the confirmation notice to the successful bidder at step 274. At step 276, the auction server 30 sends an update to the participating bidders indicating that a successful qualifying bid was submitted. The auction is then completed at step 278.

If the number of lots of the auction item remaining is greater than zero at step 280, then auction server 30 sends the confirmation to the successful bidder at step 282. At step 284 auction server 30 advises the bidders of the successful qualifying bid and of the number of lots of the auction item remaining. At step 286, auction module 50 retrieves the auction parameters for the remaining one or more lots of the auction item and generates the next auction new starting price. The next auction starts at step 288.

At step 268, the bid submitted is found to be invalid. At step 290, the administration module 70 prepares a notice rejecting the invalid bid. At step 292 the auction module 50 generates the auction current prices and the current values of the dynamic parameters for the one or more lots in accordance with the corresponding stored auction parameters. At step 294, the auction server 30 sends the current prices and the current values of the dynamic parameters as well as the bid rejection notice to the unsuccessful bidder. The auction continues at step 296.

Reference is now made to FIG. 9 which illustrates a method for determining whether the reserve price for an active auction has been reached at step 256 of FIG. 7. The method commences at step 298. At step 300 an update event occurs which prompts the auction server 30 to retrieve the updated auction data at step 302 from the system database 40 and the auction module 50. The updated auction data may include, for example, the adjusted auction price, the time remaining, and the number of bidders participating in the auction. The auction module 50 generates an adjusted auction price at step 304. At step 306, the auction server 30 and auction module 50 determine whether the reserve price for the lot has been reached. For a declining price auction if the adjusted auction price is greater than the reserve price or for a rising price auction ("want ad"), if the adjusted auction price is lesser than the maximum price set by the offeror in the auction item profile, then the reserve price or maximum price set by the offeror in the auction item profile for the lot has not been reached and the auction module 50 proceeds to step 308. The auction module 50 generates an adjusted auction price for the lot at step 310. At step 312, the communication module 80 of the auction server sends the adjusted auction price to the bidders and the auction continues until the next update event.

For a declining price auction if the adjusted auction price is lesser than or equal to the reserve price or for a rising price auction ("want ad"), if the adjusted auction price is greater than or equal to the maximum price, the reserve price or maximum price set by the offeror in the auction item profile has been reached, and the method proceeds to step 314. At step 316, the auction server 30 prepares an update and notifies the participating bidders that the reserve price was reached and that the auction has been completed. As will be illustrated with reference to FIG. 10, a second auction for the lot may be commenced at step 318. The starting price and the reserve price of the lot in the second auction may be dynamically adjusted to increase the probability of obtaining a qualifying bid.

Alternatively the auction server 30 could calculate in advance at what time the reserve price will be reached and an update event could be scheduled for that time.

Figure 10:
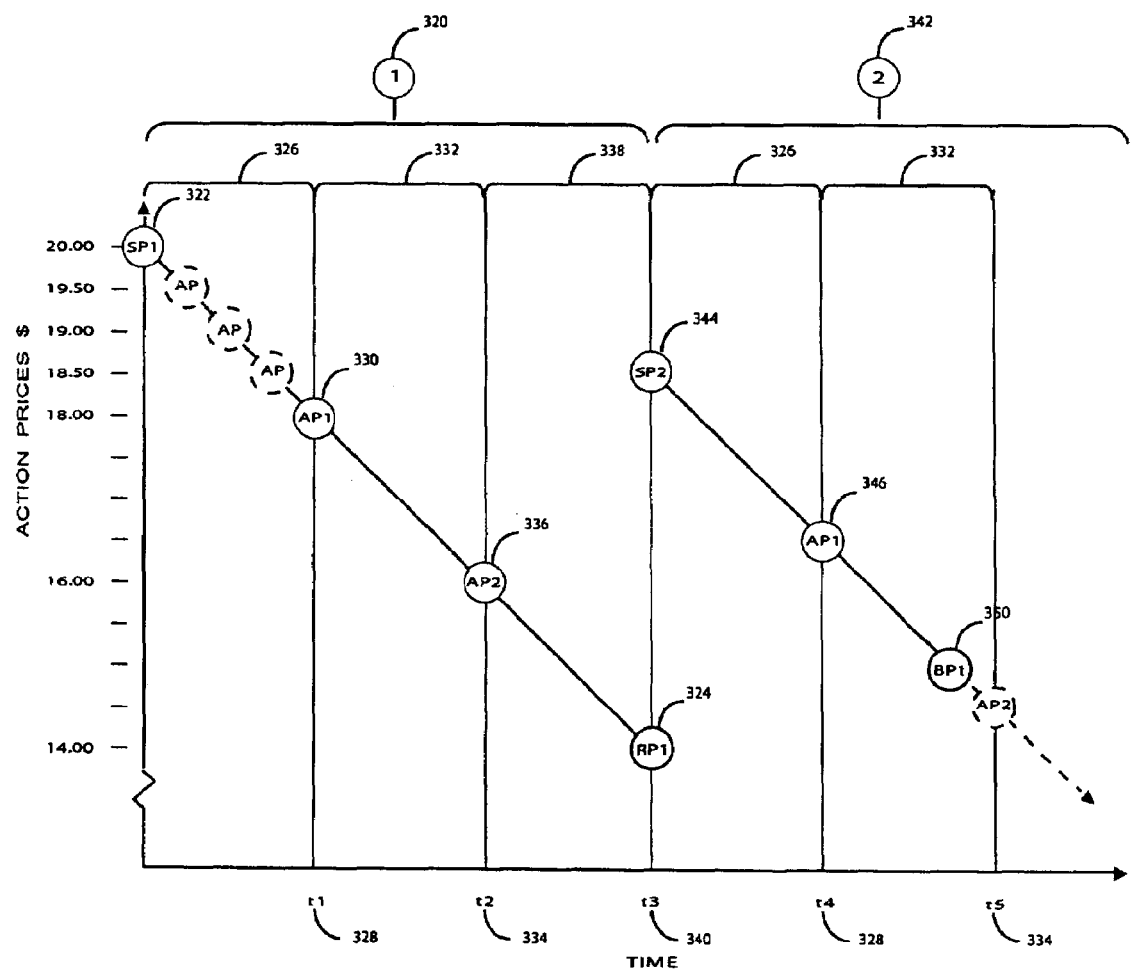
FIG. 10 is an exemplary time-line chart illustrating an auction wherein the starting price and reserve price of a lot are negatively adjusted in an embodiment of the present invention.

Referring to FIG. 10, a first auction 320 for a lot is illustrated in which the auction price reaches the reserve price. The offeror has set the first starting price 322 and first reserve price 324 for the lot at $20.00 and $14.00. The auction price change factor set by the offeror is $2.00. The first auction 320 commences at the first starting price 322 and progresses through the first sleep time 326 to the first update event 328.

Between update events, an engine module within the auction interfaces 60 of each of bidders may utilize received pricing parameters to generate automatically one or more auction prices for the lot. For example the engine module may generate price $19.50, price $19.00 and price $18.50, between the start of the auction 320 and update event 328. Utilizing such engine module makes the pricing of the lot more dynamic while minimizing the load on the auction module 50.

In the current exemplary embodiment, no bids were submitted by the participating bidders during the first sleep time 326. At the first update event 328, the auction system 10 determines whether the first reserve price 324 has been reached. Since the first reserve price 324 has not been reached at event 328, a first adjusted auction price 330 of $18.00 (i.e. $20.00 minus $2.00) is generated and sent to the bidders. It is understood that pricing parameters may be sent at the same time as the auction price. The first auction 320 continues through a second sleep time 332 until a second update event 334 occurs. Once again, no bids have been submitted for the lot and a second adjusted price 336 of $16.00 (i.e. $18.00 minus $2.00) is generated and sent to the bidders. After a third sleep time 338 has expired without the submission of a bid, a third update event 340 is reached. At the third update event 340, a third adjusted auction price of $14.00 (i.e. $16.00 minus $2.00) is generated and compared to the first reserve price 324. The third adjusted price is equal to the reserve price 324. The first auction 320 of the first lot is completed or terminated since the first reserve price 324 has been reached. The first lot has not been sold.

For simplicity, the terms used in the second auction 342 of a second lot of FIG. 10, such as for example, starting price, reserve price and sleep times and update events have been given the same reference numerals, where applicable, as in the first auction 320 of a first lot. Furthermore, the terms used in the auctions described in FIGS. 10 to 14 have been given the same reference numerals, where applicable, as the terms described in FIG. 10 for ease of understanding.

A second auction 342 for the second lot is commenced at a dynamic second starting price 344 of $18.50 based on the first starting price 322 and a spread factor of $1.50. The second starting price 344 has been dynamically generated to be less than the first starting price 322 in the first auction of a first lot so as to influence bidders to submit bids. A second reserve price is generated for the second auction 342 using a dynamic reserve factor of $1.00. Hence, the dynamic second reserve price is $13.00 (i.e. $14.00 minus $1.00).

The second auction 342 of a second lot progresses through a first sleep time 326 until the first update event 328 is reached. At the first update event 328 a first adjusted auction price 346 of $16.50 is generated and sent to the bidders. Before a second sleep time 332 expires and a second update event 334 occurs, a first bid price 350 of $15.00 is submitted by a bidder for the lot. If the bid is valid, the participating bidders will be notified that a successful qualifying bid was submitted and that the second auction of the second lot is completed.

Figure 11:
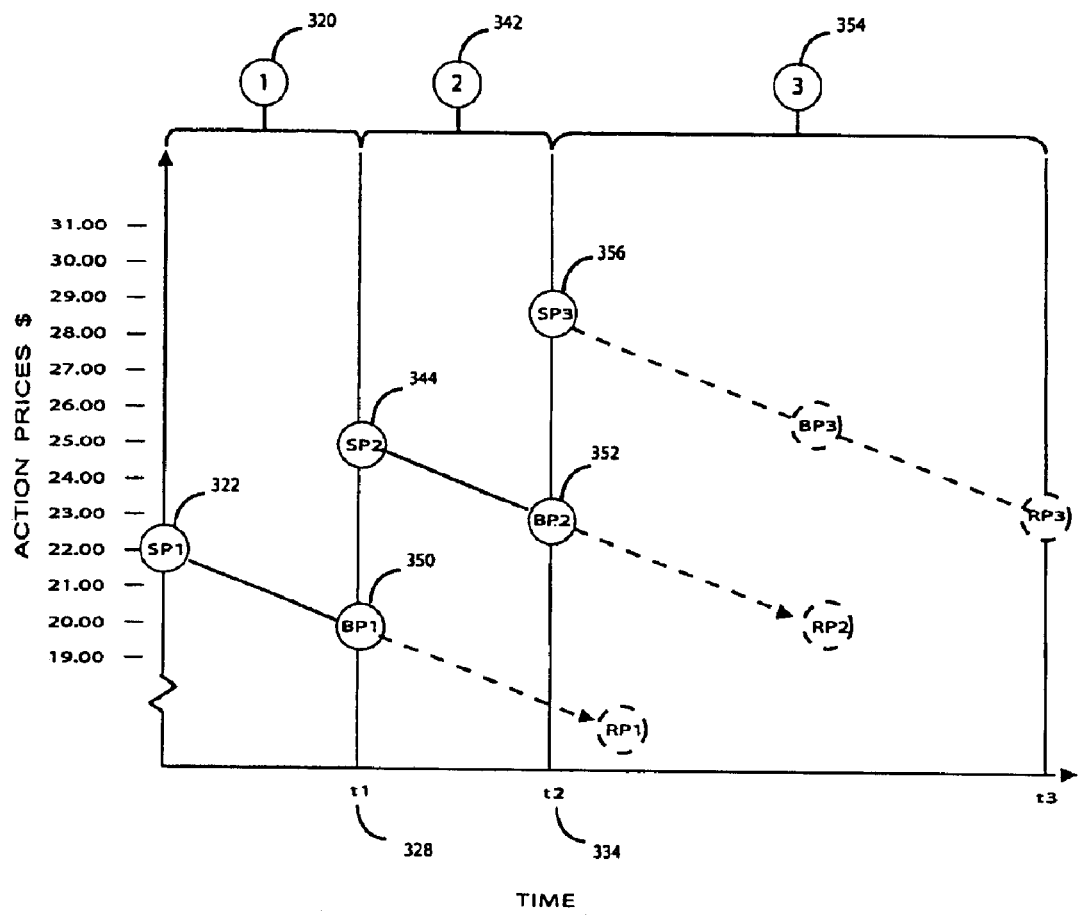
FIG. 11 is an exemplary time-line chart illustrating an auction wherein the starting price of a lot is positively adjusted in an embodiment of the present invention.

In declining price auctions a dynamically defined starting price and reserve price may increase between an active auction and a subsequent auction if a bid price is submitted. Referring to FIG. 11, a first auction 320 commences at a first starting price 322 of $22.00 and continues until a successful bid is submitted or the reserve price is reached. Shortly after the first auction 320 commences, a successful qualifying bid price 350 of $20.00 is submitted and the auction is completed at $t_1$ 328.

The offeror commences a second auction 342 for an identical or similar lot at a dynamic starting price that is greater than the starting price 322 in the first auction 320 for the first lot. Using a higher starting price may increase the amount of the bid prices submitted and, hence, the profit earned by the offeror, it may also result in a bid price that is greater than the first starting price of $22.00 in auction 320 for the first lot. In this example, the offeror has specified that, following a successful bid, the starting price will be 25% greater than the successful bid. A new starting price 344 of $25.00 is generated for the second auction 342 of the second lot using the spread factor (i.e. $20.00 plus 25% of $20.00=$25.00). The second starting price may be generated based on the starting price in the preceding auction of a lot or on the current price of a lot in a concurrent auction or any other auction parameter or auction price. A new reserve price may be dynamically generated using the successful bid price and/or a spread factor. The second auction for the second lot continues until a second successful bid price 352 of $23.00 is submitted by a bidder. The second successful bid price 352 is greater than the first starting price 322 of $22.00 in auction 320. The second auction for the second lot is completed at time $t_2$ 334.

The offeror then commences a third auction 354 for another identical or similar lot at a starting price 356 that is dynamically defined to be greater than the successful bid in the second auction 342 for the second lot. The new starting price 356 in the third auction 354 is $28.75 (i.e. $23.00 plus $5.75=$28.75). A new reserve price may also be dynamically generated. The third auction 354 for the third lot will continue until either a qualifying successful bid is submitted or the reserve price is reached.

Figure 12:
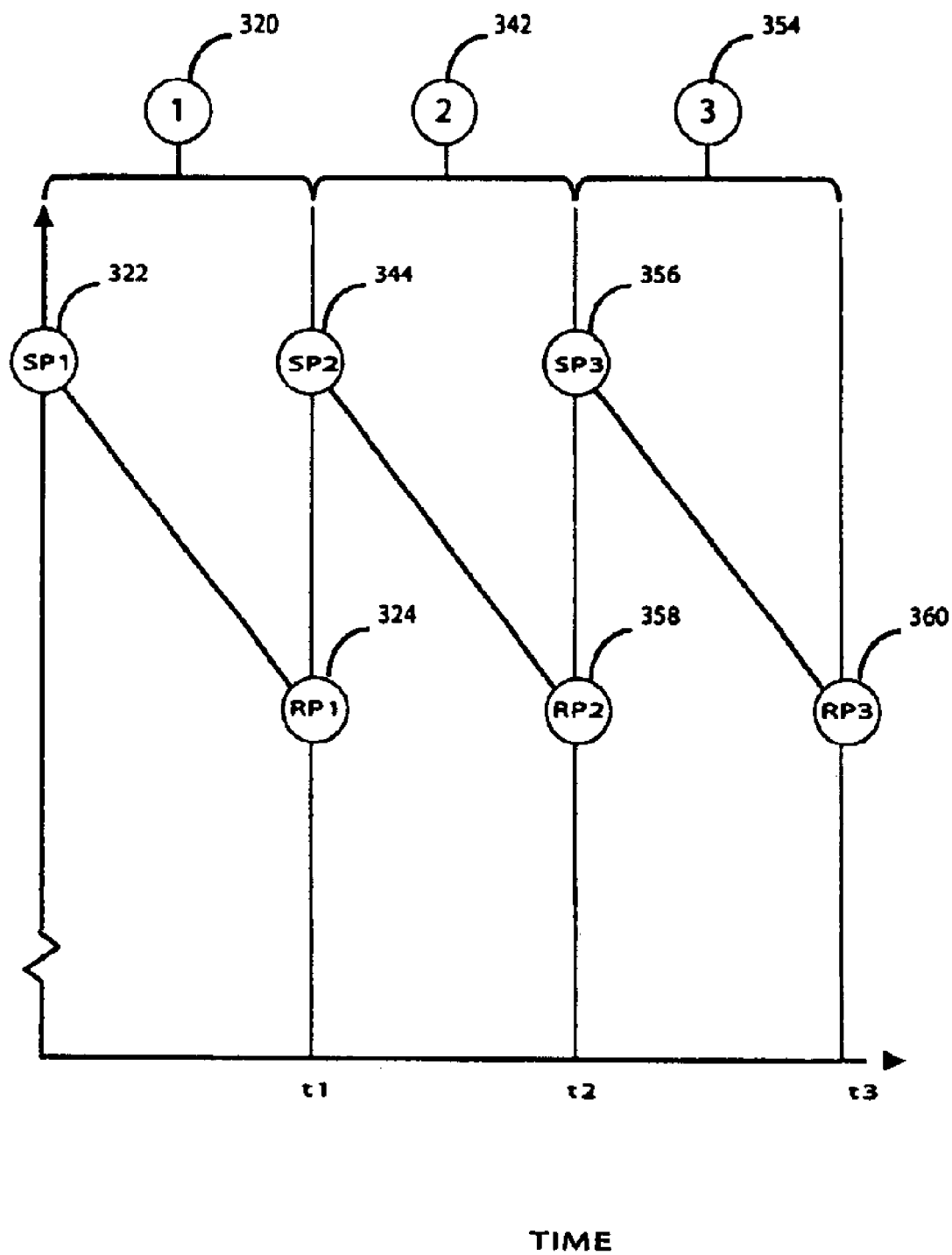
FIG. 12 is an exemplary time-line chart illustrating an auction wherein the starting price of a lot is static in an embodiment of the present invention.

It is further understood that an offeror may choose to statically define the starting price and reserve price in one or more auctions for lots, as shown in FIG. 12. Referring to FIG. 12, a first auction 320 of lot commences and progresses through one or more sleep times and update events (not shown) until the reserve price 324 is reached or a bid price is submitted. Since the starting price 322 and reserve price 324 have been defined as static by the offeror in the auction item profile, the starting prices 344 and 356 and the reserve prices 358 and 360 will remain unchanged in the subsequent second and third auctions 342 and 354, respectively, for example.

Figure 13:
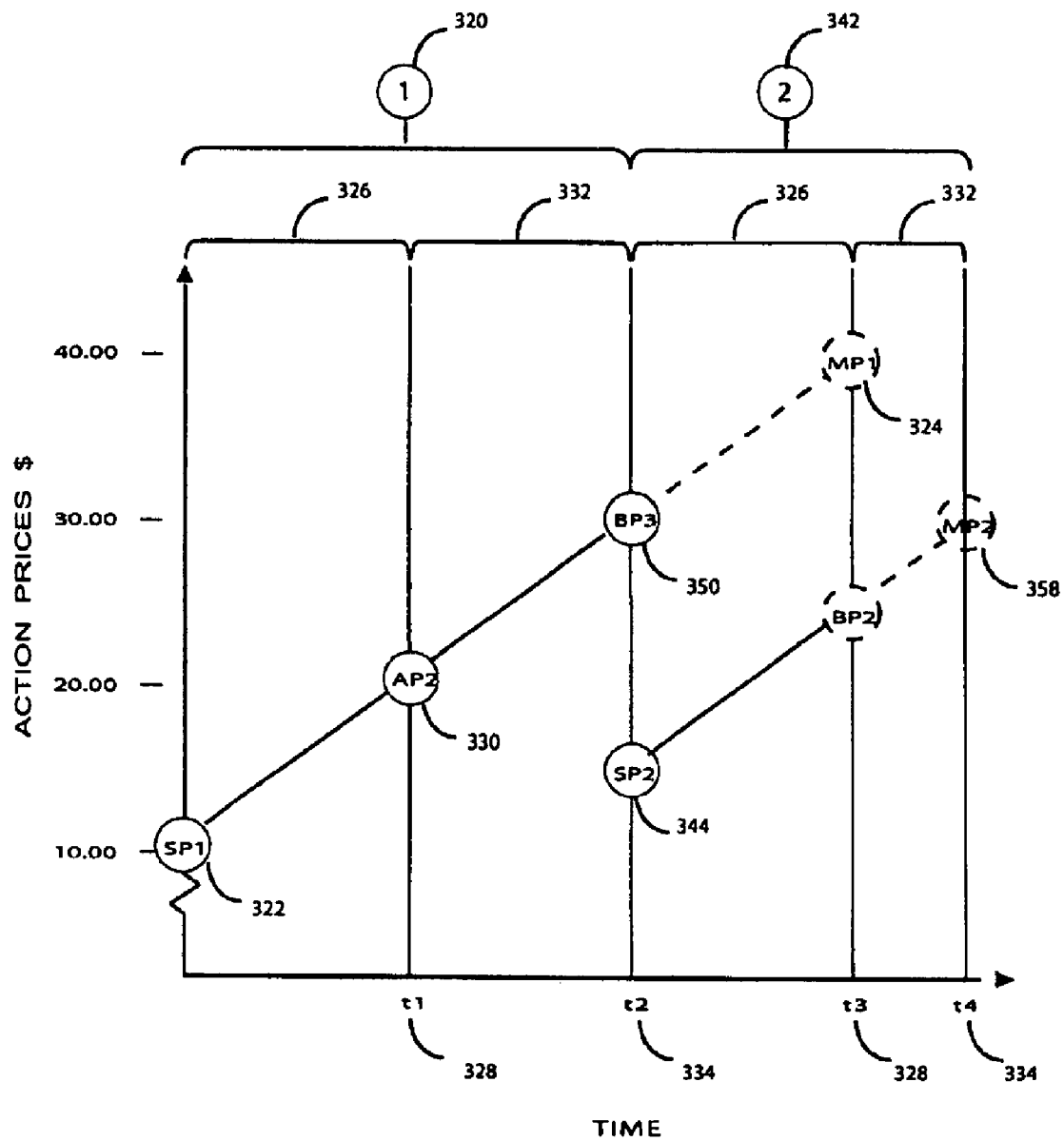
FIG. 13 is an exemplary time-line chart illustrating a rising price auction in an embodiment of the present invention.

Reference is now made to FIG. 13 which illustrates a "want ad" auction as previously discussed. The auction participant who creates the auction item profile is still referred to as the offeror and the participant who takes action during the auction (who bids) is still referred to as the bidder. Consequently, in a declining auction usually the offeror wants to supply the lot and the bidder chooses to acquire it, while in a rising auction usually the offeror wants to obtain the lot and the bidder chooses to provide it. It should also be noted that the transaction could be a purchase, a rental, a lease or some other form of exchange or contractual arrangement. It should also be noted that the offeror set the terms of the transaction and the bidder accept these terms. In a first "want ad" auction 320 the offeror wishes to obtain the lot described. In this example, the offeror has set a starting price 322 of $10.00 and an auction price change factor of $10.00. In a rising auction the "maximum price" is the equivalent of the reserve price in a declining auction, it is the greatest price that the offeror is willing to pay the bidder for the lot. The offeror has decided that the "maximum price" 324 is $40.00.

The first "want ad" auction 320 commences at the starting price 322 and progresses through the first sleep time 326 to the first update event 328. At the first update event 328 the offeror has been unable to locate a bidder who is willing to supply the lot to the offeror. Since no bids have been submitted, the auction module 50 determines whether the maximum price has been reached. In this instance, the maximum price 324 has not been reached. Hence, the auction module 50 generates a first adjusted auction price 330 of $20.00 (i.e. $10.00 plus $10.00) based on the offeror-specified auction parameters and the auction price change factor.

The first "want ad" auction continues through a second sleep time 332 until a second update event 334 occurs. At the second update event 334 a first bid price 350 of $30.00 is submitted by a bidder for the lot. If the bid is valid, the auction participants will be notified that a successful qualifying bid was submitted and that the first "want ad" auction is completed.

If the offeror requires more than one lot, a second "want ad" auction 342 is commenced at a dynamic starting price 344 of $15.00. The offeror may choose to dynamically define the starting price 344 in the second "want ad" auction if they are anxious to purchase an additional lot. By setting the starting price 344 in the second "want ad" auction 342 greater than in the first auction 320, the offeror may be able to attract willing bidders in a shorter period of time. A second maximum price 358 may also be generated dynamically for the second "want ad" auction 342. The second maximum price may be equal to or less than the first successful bid price 350 of $30.00 to increase the likelihood of obtaining more lots for a lesser price than the first successful bid price 350 of $30.00. The second "want ad" auction 342 is commenced and will progress until either a bid price is submitted or the maximum price is reached.

Figure 14:
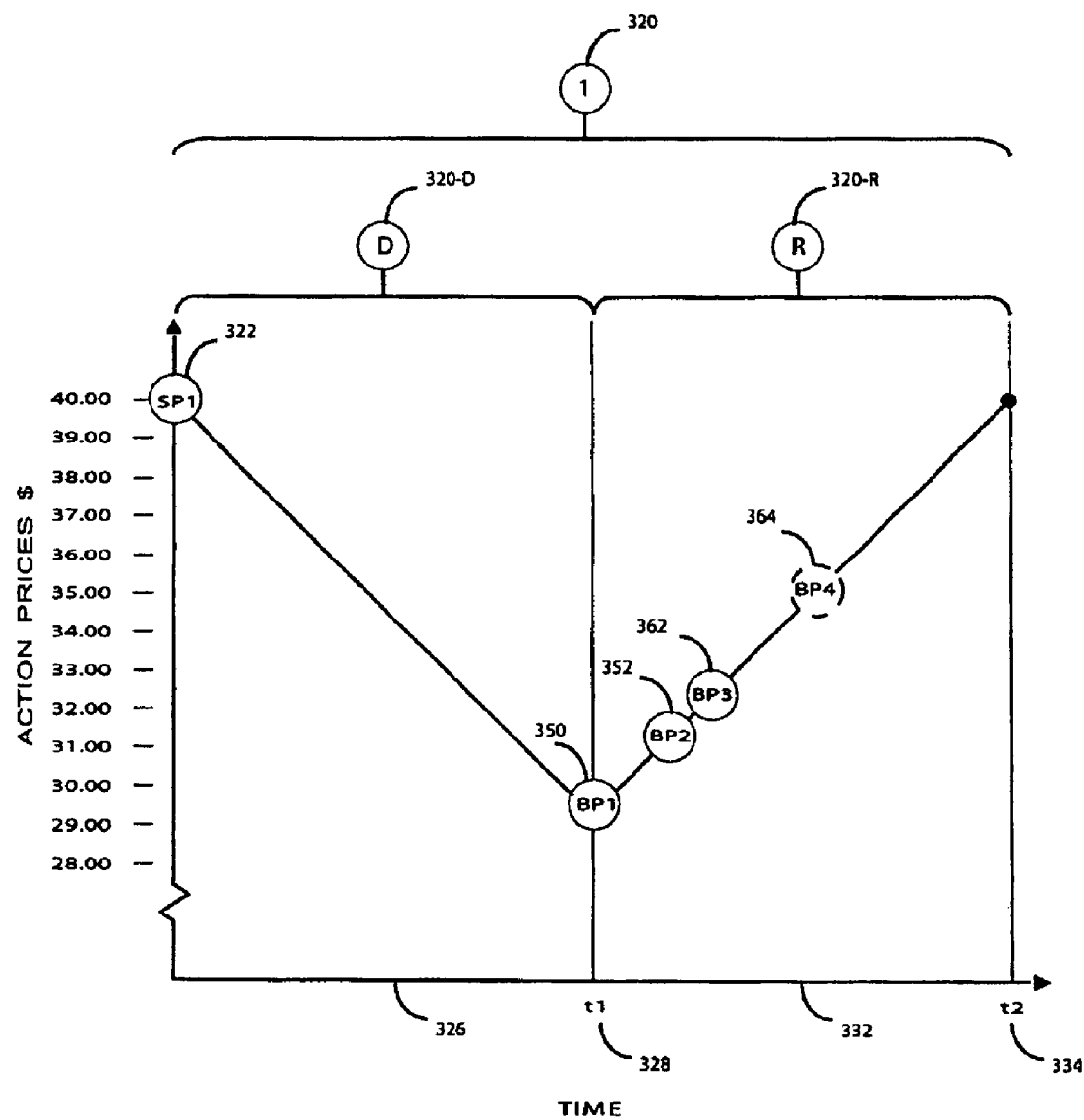
FIG. 14 is an exemplary time-line chart illustrating a rising-declining price auction and a declining-rising price auction in an embodiment of the present invention.

Reference is now made to FIG. 14 which illustrates a first auction 320 for a lot consisting of a declining price auction 320-D and a rising price auction 320-R. A declining-rising auction may be used, for example, by an offeror auctioning a rare or collectible lot, such as artwork. The use of a declining-rising auction would enable unsuccessful bidders to reevaluate their desire for the lot and to bid over the previous bid price. A declining-rising auction is also beneficial to the offeror because it may increase the final bid price for the lot.

Referring to FIG. 14, the first auction 320-D commences at a first starting price 322 of $40.00, and continues until a successful bid price 350 is submitted. In this example, the bid price 350 is submitted at a first update event 328. If the submitted bid price 350 is determined to be valid by the auction module 50, the declining price auction 320-D is completed. The rising price auction 320-R then commences at the first update event 328 until the offeror-specified auction duration 332 expires at event 334. During the rising price auction 320-R, the price for the lot will increase, from the valid bid price 350, dynamically in accordance with the auction parameters. The bidders, including the unsuccessful bidders in the declining price auction 320-D, will then have until the expiry of the auction duration 332 to submit rising price bids 352, 362, 364. Bids will be accepted until the end of the rising price auction. If bid 364 is the last valid bid submitted during the rising price auction, bid 364 will be the successful bid. The lot is sold to the bidder who has placed the highest bid. If a rising bid price 352 is not received by the auction system 10 before the rising price auction 320-R is completed, the lot will be sold to the bidder who has submitted the bid price 350. The duration of the rising auction may be defined in various ways. For example it may defined as the duration of the preceding declining auction or the rising auction may end after a predefined period of inactivity. It may also be defined by a linear, exponential or any other mathematical function or numerical series. The duration of the rising auction may also take into account various internal or external factors such as the number of auction participants, the number of bids received, past auctions results or durations, the fluctuations of external values such as stock, bond, commodity or currency indices, the weather or any fixed or variable value made available by the parameter module.

A rising-declining price auction has not been illustrated. It would have the same methods as a declining-rising price auction but would usually apply to a "want ad" auction. The first valid bid in the rising part of the auction would start the declining part of the auction where bidders could bid to supply the lot for less than the first bid. The successful bidder would be the last bidder who as the last bidder would have placed the lowest bid.

In a declining-rising auction or in a rising-declining auction, parameters for the rising price auction will differ from the parameters for the declining price auction.

Figure 15:
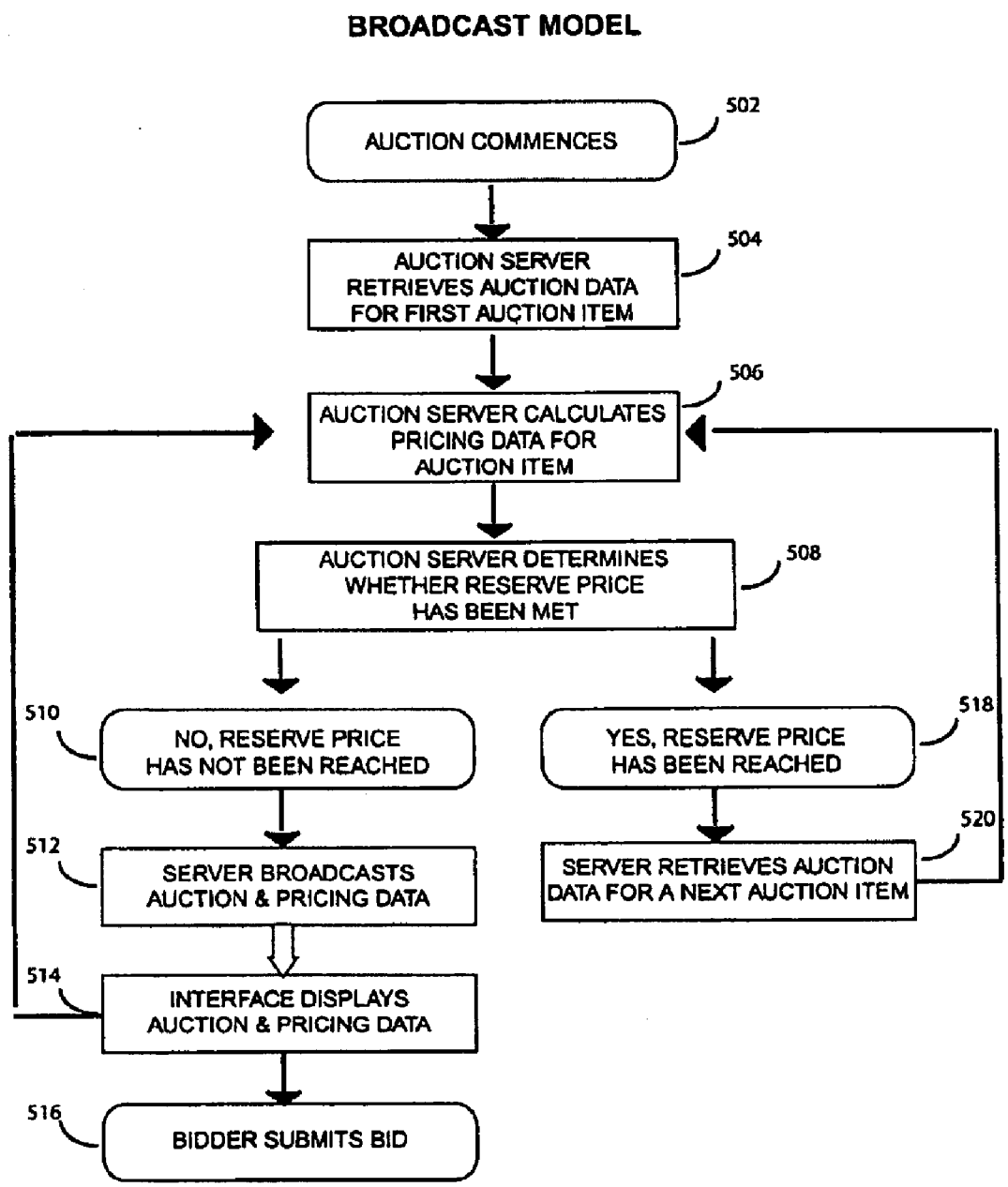
FIG. 15 is a flowchart illustrating steps to be performed in an auction when the reserve price is reached in an embodiment of the present invention utilizing a broadcast network.
Figure 16:
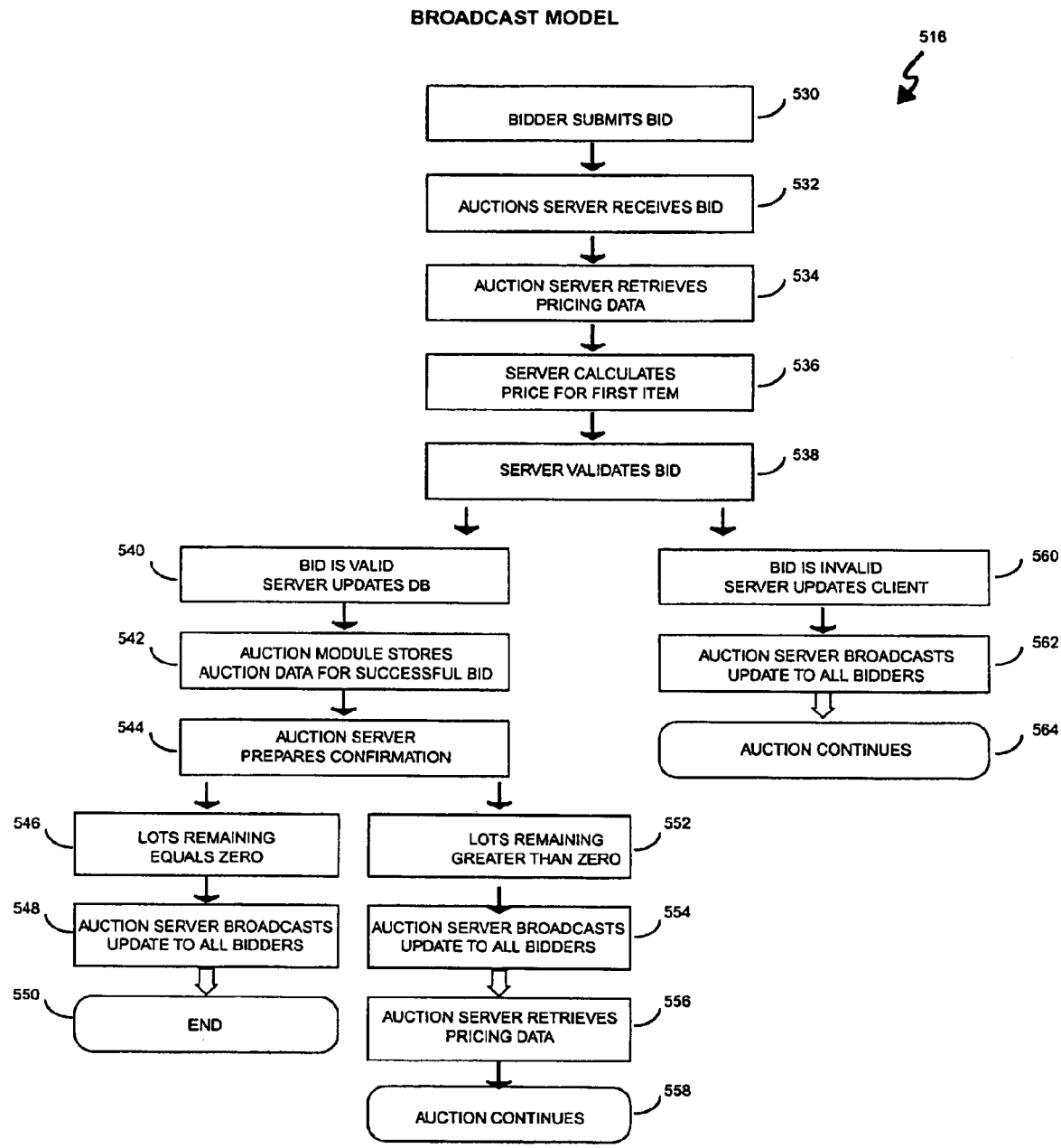
FIG. 16 is a flowchart illustrating steps to be performed in validating an auction participant's bid in an embodiment of the present invention utilizing a broadcast network.

Reference is made to FIGS. 15 and 16 which illustrate a method for auctioning one or more lots via a broadcast network in accordance with a preferred embodiment of the present invention.

Referring to FIG. 15 which illustrates the method for broadcasting one or more auctions through a broadcast network. The method commences at step 502 of FIG. 15 when the auction starts. At step 504 the auction system 30 retrieves the auction data for the one or more items to be auctioned. The method proceeds to step 506 where the auction module 50 calculates the auction current prices for the one or more lots in accordance with the corresponding stored auction parameters. At step 508 the auction server 30 determines whether the reserve price as been reached for anyone of the one or more lots.

If the reserve price has not been reached, the method proceeds to step 510 and at step 512 the server broadcasts the auction and the pricing data to all the auction interfaces 60. At step 514 the auction interfaces 60 display the auction data and pricing data. The auction interface 60 may, for example, be provided with the auction item profile, the starting price, the number of lots for sale, the quantity sold, the rate of change and the speed of change. Additionally, the previous or the current reserve price may also be displayed to the bidders to influence the submission of bids. At step 516 a bidder submits a bid. If a bid is not received, step 516 does not take place, and instead, steps 506, 508, 510, 512 and 514 are repeated. This continues until either a bid is submitted at step 516 or at step 508 the auction server determines that a reserve price has been reached, in which case the method proceed to step 518.

At step 518 the reserve price of one lot has been reached. At step 520 the auction server 30 retrieves auction data for a new lot and proceeds to step 506 for the new lot.

Referring to FIG. 16, method 516 starts with step 530 when a bidder submits a bid. At step 532 the auction server 30 receives the bid. At step 534 the auction server 30 retrieves the pricing data and calculates the price at the time when the bid was received for the lot the bidder bid on at step 536. At step 538 the auction server 30 validates the bid. For a declining price auction if the bid price is greater than or equal to the auction price at bid time the bid is deemed to be valid and the method 516 proceeds to step 540. In the case of a rising price auction ("want ad"), a valid bid must be lesser than or equal to the auction price. If the bid is deemed invalid, the method proceeds to step 564.

At step 542, auction module 50 stores the auction data for the successful qualifying bid, including the bid price, the bidder's personal profile, the number of lots bid for, the number of lots remaining and the auction item profile, in system database 40. At step 544, the administration module 70 prepares a notice confirming that a successful qualifying bid was submitted. If the number of lots of the auction item remaining is equal to zero at step 546, the auction server 30 broadcasts the confirmation of the successful bid to all the bidders at step 548. The auction ends at step 550.

If the number, of lots of the auction item remaining is greater than zero at step 552, then auction server 30 broadcasts the confirmation of the successful bid to all the bidders at step 554. At step 556, auction module 50 retrieves the auction parameters for the remaining one or more lots of the auction item and generates the next auction new starting price. The next auction starts at step 558.

At step 560, the bid submitted is found to be invalid. At step 562, the auction server 30 broadcast the update to all the bidders. At step 564 the auction continues.

Auctions are said to be concurrent when two or more lots are auctioned during the same time period and belong to a group of concurrent auctions. In a concurrent auctions group, lots are ordered on the basis of the date and time when the auction for each lot started. Concurrent auctions may be declining, rising, declining-rising or rising-declining. Concurrent auctions in a group have at least one common parameter, follow at least one common rule or belong to the same category. For example, a concurrent auction group could have a starting price rule. The starting price rule may state that when a new lot is added to a group of concurrent declining and/or declining-rising price auctions, the starting price of the new lot must be greater than or equal to the current price of any lot that is already in the group. Likewise the starting price rule may state that when a new lot is added to a group of concurrent rising and/or rising-declining price auctions, the starting price of the new lot must be lesser than or equal to the current price of any lot that is already in the group. Concurrent auctions could offer various package tours to the same destination during the same period. Concurrent auctions need not and typically will not start at the same time. In concurrent auctions, it is understood that different lots may be offered by different offerors, it is also understood that lots may be different, similar or the same, it is also understood that concurrent auctions may have different auctions parameters provided that they have at least one common parameter, follow at least one common rule or belong to the same category. In a preferred embodiment of the present invention lots on a concurrent auction list would share a pre-set bundle of parameters.

Figure 17:
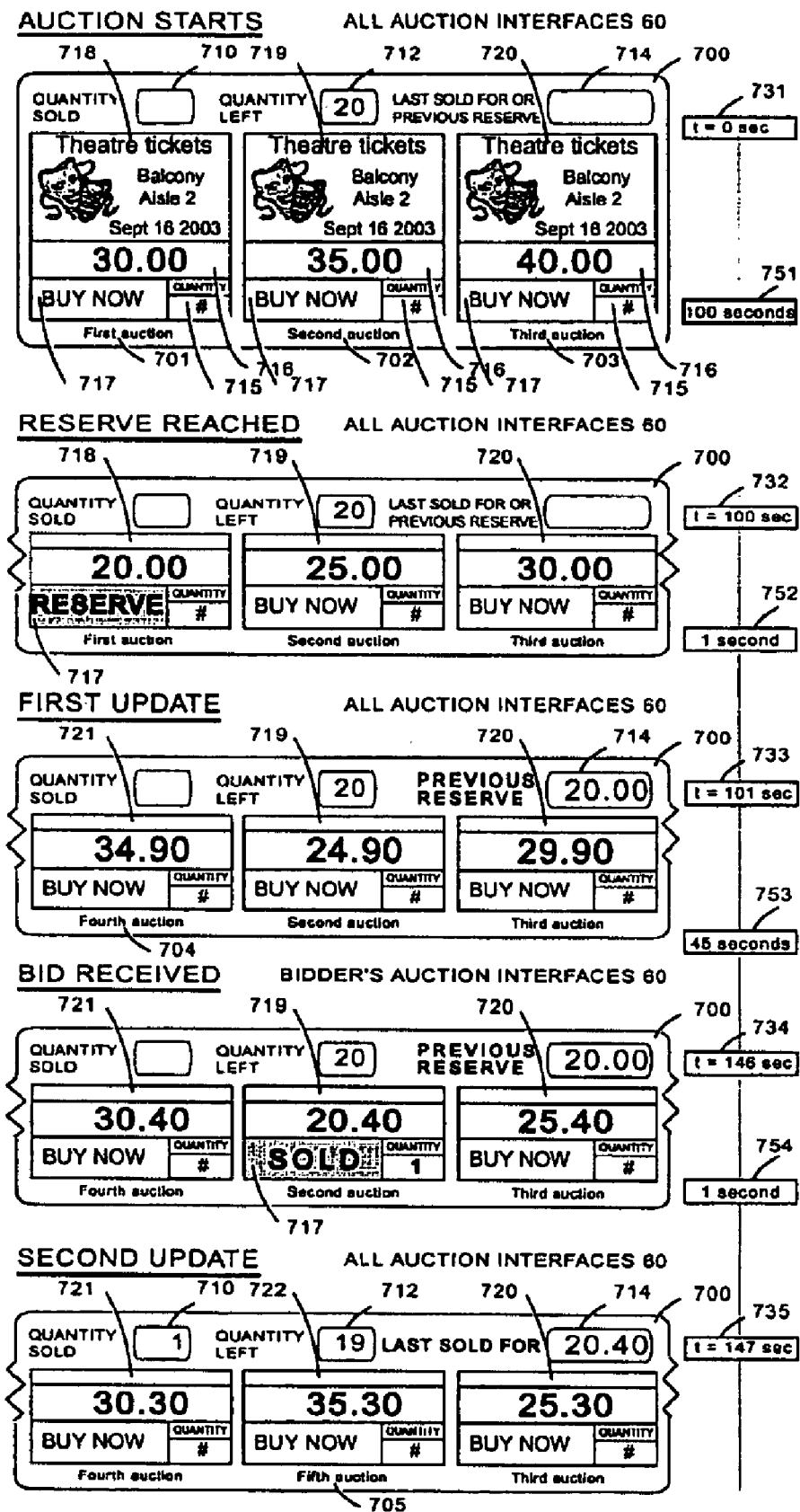
FIGS. 17 and 18 present an example of the concurrent auctioning of one or more lots in an embodiment of the present invention.

Referring now to FIG. 17, a screen 700 of a bidder's interface is shown for a plurality of concurrent declining price auctions. All lots are offered by the same offeror and follow the previously described starting price rule. Initially auctions for three lots are started at the same time. Screen 700 is the screen displayed to a bidder once they have elected to participate in an active or pending auction for one or more lots. In the example shown in FIG. 17, screen 700 displays three concurrent auctions, a first auction 701, a second auction 702 and a third auction 703 for tickets to an upcoming theatrical event.

The auctions 701, 702 and 703 are shown in FIG. 17 as the auctions start at event 731. Each of the first, second and third auctions 701, 702 and 703 has an associated auction item profile 718, 719 and 720, respectively. The auctions 701, 702 and 703 each also include a pricing field 716 that displays the auction price for each of the concurrent active auctions. A bidder may opt to submit a bid for one or more of the lots at the auction price using an action button 717. The action button 717 may include a quantity field 715 that enables the bidders to specify the number of lots they wish to purchase. Alternatively, the action button 717 may have a contact number, such as a telephone number or access code that a bidder may utilize to submit a bid for a lot.

At event 731, the current prices for the first, second and third auctions 701, 702 and 703 are $30.00, $35.00 and $40.00, respectively. The auction price change factor has been set by the offeror and/or auction server 30 at $0.10 per second. Furthermore, a reserve price of $20.00 for each of the auctions 701, 702 and 703 has been set by the offeror and/or the auction server 30 and the price spread factor has been set at $5.00. Field 710 displays how many lots have been sold, it is left blank at the start of the auction, field 712 displays how many lots are left for sale, currently 20, field 714 displays the last successful bid price at which a lot or lots were sold or alternatively the last reserved price which has been reached previously. Displaying the previously reached reserve price or the last successful bid price to the bidders may have a direct effect on the bidding psychology of the auction participants and promote the submission of successful bids. A bidder knowing that the auction price is approaching the previously reached reserve price or the last successful bid price, as displayed in field 714, may be more inclined to submit a bid.

After a first sleep interval 751 of 100 seconds has elapsed, at event 732, the auction price for the second auction 702 and the third auction 703 have decreased to $25.00 and $30.00, respectively and the adjusted auction price for the first auction 701 is now $20.00 and has reached the reserve price. At that point the auction interface 60 of every participant displays the message "RESERVE" in field 717 of auction 701 and the auction server 30 initiates a first update event 733.

Because the auctions currently described are taking place on a unicast network, during the first sleep interval 751, and during every succeeding sleep interval, an engine module within the auction interfaces 60 of each of bidders utilizes received pricing parameters to automatically generate every second, a new auction price for the current auctions 701, 702, 703, the same will be true for the following auctions, and each price will be $0.10 lower than the previous one. If the auctions took place on a broadcast network the auction server 30 would generate and broadcast the new auction prices every second.

At the first update event 733, the auction module 50 commences a fourth auction 704 to replace auction 701 which finished when the reserve price was reached. The fourth auction 704 has an associated auction item profile 721. Because the lot with profile 718 reached the reserve price and was not sold, it will be understood that auction 704 could be associated with the same item profile 718 instead of the new item profile 721. After a lot has reached the reserve price whether a new lot or the same lot is offered in the next auction may be set by the offeror as a part of the auction parameters. If a new lot is offered usually the lot that reached reserve is placed at the end of the queue of lots and is offered again at the end of the auction but it may alternatively be offered again immediately, it may be offered after some number of other lots or it may be removed from the auction altogether. In the current example the offeror has specified that when a lot reaches the reserve price, it goes to the end of the queue of lots, therefore the quantity left in field 712 remains unchanged. The auction module 50 generates a new starting price for the auction 704 with item profile 721. In the current example the offeror has chosen a dynamically generated starting price. For auction 704, the starting price will be based on the highest auction price in the active auctions 702 and 703 plus the spread factor. This ensures that the starting price in the fourth auction 704 will not be less than the auction prices in the concurrent active auctions. Accordingly, the starting price in the fourth auction 704 is $35.00 (i.e. $30.00 plus $5.00), based on the auction price in the third auction 703 and the spread factor. At update event 733, because the update has taken 1 second, interval 752, the prices, displayed in field 716 on, the screen 700 of the one or more bidders participating in the auctions, are, $34.90 for auction 704, 24.90 for auction 702, and 29.90 for auction 703.

Because the reserve price of $20.00 was reached in the first auction 701, $20.00, at update event 733, it is displayed in field 714 now labeled "PREVIOUS RESERVE" and the auction module 50 generates a new reserve price in accordance with the auction parameters set by the offeror or the auction-system 10. In this example the offeror has specified that the new reserve price will dynamically decrease by a reserve price factor of 10% (rounded up to the nearest $0.10). Hence, the new reserve price in the 3 concurrent active auctions will be $18.00 ($20.00−($20.00×10%)=$18.00). This reserve price may not be displayed to the auction participants but may be transmitted to the auction interface 60.

The fourth, second and third auctions, 704, 702 and 703 continue through a third sleep interval 753. During sleep interval 753, when the adjusted auction prices in the fourth, second and third auctions 704, 702 and 703 have decreased to $30.40, $20.40 and $25.40, respectively, at event 734 a bid at the price of $20.40 is submitted for the lot 719 of the second auction 702. The bid is validated and triggers update event 735. The bid may have been placed directly by the bidder at the time when field 716 of auction 704 was displaying the price $20.40, or the bidder may have used automated bidding having previously stored the bid value $20.40 in an automated bidding system that may reside in the auction interface 60 or in the auction server 30. A stored bid is automatically exercised when the price reaches the predetermined price. If more than one bidder stores an automated bid at the same price, bids are time stamped and are exercised in the order in which they were stored. After the first stored bid has been exercised, the next stored bid may then be exercised during subsequent auctions, if any.

At update event 735, the participating bidders are notified that a successful bid was submitted by displaying the successful bid, $20.40 in field 714 and changing the label for field 714 to "LAST SOLD FOR", by increasing the number sold in field 710 to 1 and decreasing the quantity left to 19 in field 712. Other text or graphic messages may also be utilized to indicate to the bidders that a lot has been sold. At the update event 735, the auction module 50 commences a fifth auction 705 to replace auction 702 which finished when lot 719 was sold. The fifth auction 705 has an associated auction item profile 722. The starting price in the fifth auction 705 will be greater than or at least equal to the auction prices of any concurrent active auctions. In this example, the offeror has specified that after the receipt of a successful qualifying bid price in a preceding auction, the starting price in the subsequent one or more auctions will be $5.00 (i.e. the spread factor) greater than the highest auction price of any concurrent active auctions. The starting price for the lots in the fifth auction 705 would be $35.40 ($30.40 plus $5.00). Because the update has taken 1 second, interval 754, the prices, displayed in field 716 on the screen 700 of the one or more bidders participating in the auctions, are, $30.30 for auction 704, 35.30 for auction 705, and 25.30 for auction 703. Because a lot was sold in auction 702 the auction module 50 generates a new reserve price in accordance with the auction parameters set by the offeror or the auction system 10. In this example the offeror has specified that the new reserve price would be equal to the successful bid price, therefore the new reserve price transmitted to the auction interface 60 is $20.40.

Figure 18:
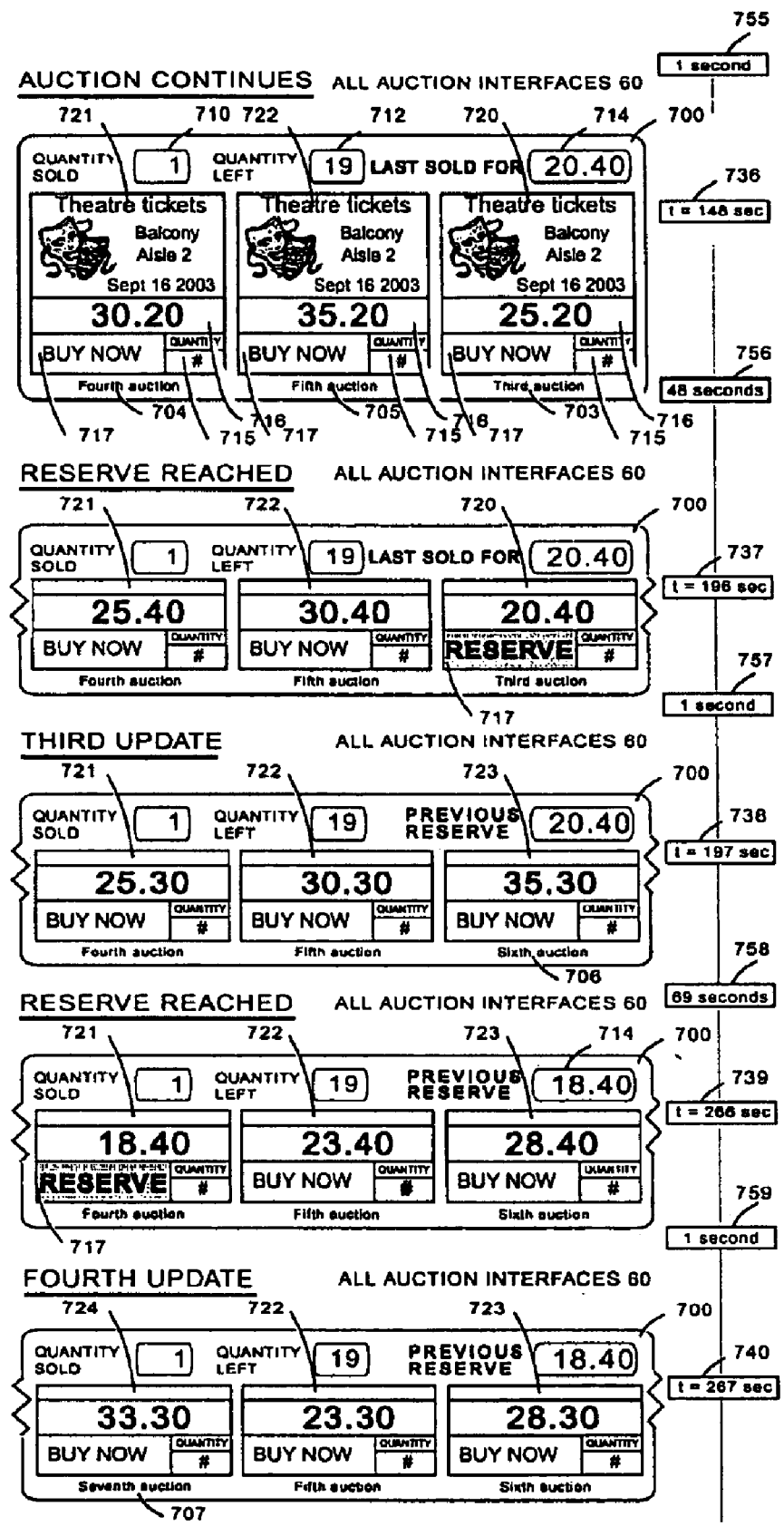

The auctions in FIG. 17 are continued in FIG. 18. Event 736 show screen 700 after 1 second has elapsed; the prices displayed in field 716 are $30.20 for auction 704, 35.20 for auction 705 and 25.20 for auction 703. Field 710 tells the auction participants that one lot has been sold, field 712 tells them that 19 are left to be sold and field 714 tell them that the last item sold for $20.40.

After a sleep interval 756 of 48 seconds auction 720 reaches the reserve price of $20.40 at event 737. An update event 738 is triggered and the auction module 50 commences a sixth auction 706 to replace auction 703. The sixth auction 706 has an associated auction item profile 723. The starting price for the lots in the sixth auction 706 would be $35.40 ($30.40 plus $5.00). Because the update has taken 1 second, interval 757, the prices, displayed in field 716 on the screen 700 of the one or more bidders participating in the auctions, are, $25.30 for auction 704, 30.30 for auction 705, and 35.30 for auction 706.

The auction module 50 generates a new reserve in accordance with the auction parameters as discussed at update event 733. Hence, the new reserve price in the 3 concurrent active auctions will be $18.40 (i.e. $20.40 minus ($20.40× 10%) rounded up to the nearest $0.10). The new reserve price, $18.40, is transmitted to the bidders' auction interface 60 and the previous reserve price, $20.40 is displayed in field 714 with label "PREVIOUS RESERVE".

After sleep interval 758, at event 739 the reserve price, $18.40, has been reached in the fourth auction 704. This triggers update event 740 and the auction module 50 commences a seventh auction 707 to replace auction 704. The seventh auction 707 has an associated auction item profile 724. The starting price for the lots in the seventh auction 707 would be $33.40 ($28.40 plus $5.00). Because the update has taken 1 second, interval 759, the prices, displayed in field 716 on the screen 700 of the one or more bidders participating in the auctions, are, $33.30 for auction 707, 23.30 for auction 705, and 28.30 for auction 706.

The auction module 50 generates a new reserve in accordance with the auction parameters as discussed at update event 733. Hence, the new reserve price in the 3 concurrent active auctions will be $16.60 (i.e. $18.40 minus ($18.40× 10%) rounded up to the nearest $0.10). The new reserve price, $16.60, is transmitted to the bidders' auction interface 60 and the previous reserve price, $18.40 is displayed in field 714 with label "PREVIOUS RESERVE".

The auctions described in FIGS. 17 and 18 illustrate a method for auctioning one or more similar or comparable lots. It is understood that dissimilar lots may be displayed on the screen 700 and auctioned simultaneously. Furthermore, the auction system 10 may be utilized as a "last minute auction" in which various time perishable lots, such as, for example, airline flights, concert tickets or food products, are offered up until the date when the time deadline expires (i.e. the airline flight departs or the best before date for the food product expires).

While what has been shown and described herein constitutes a preferred embodiment of the subject invention, it should be understood that various modifications and adaptations of such embodiment can be made without departing from the present invention, the scope of which is defined above.

We claim:

1. A method for auctioning a plurality of lots, the method comprising:
    (a) providing an auction server;
    (b) recording an auction item profile for the lots in the auction server, wherein the auction item profile includes:
        (i) a first starting price at which the auction of a first lot will commence;
        (ii) a spread factor for determining a starting price for a second lot and subsequent lots;
        (iii) an auction price change factor; and
        (iv) a first reserve price,
    (c) initiating a first auction for the first lot, wherein the first auction begins at the first starting price, and wherein the first auction has a first current price that is initially set equal to the first starting price;
    (d) during the first auction, changing the first current price according to the auction price change until the first current price reaches a first reserve price or until an offer is made for the first lot, wherein the offer is made from an auction interface coupled to the auction server through a communication network;
    (e) after (d), initiating a second auction for a second lot, wherein the second auction has a second starting price that is determined, at least in part, by combining the spread factor and the outcome of the first auction; and
    (f) adjusting the current price of the second auction while the second auction is ongoing based, at least in part, on the outcome of the first auction.

2. The method of claim 1 wherein, during (c), the auction server transmits the first starting price, the auction price change factor and the first reserve price to each of the auction interfaces and wherein during (d), the auction server periodically, after a sleep time, transmits a new first current price to each of the auction interfaces.

3. The method of claim 2, wherein, during each sleep time, each auction interface periodically changes the first current price based on the auction price change factor and displays the changed first current price.

4. The method of claim 1 wherein the current price for the auction that is being carried out is manually changed at the auction server and wherein the auction server transmits the new current price to the auction interfaces.

5. The method of claim 1 wherein the reserve price for the auction that is being carried out is manually changed.

6. The method of claim 1 wherein the reserve price for the auction that is being carried out is changed, at least in part, based on the outcome of another auction.

7. The method of claim I wherein the current price for an auction that is being carried out at any point in time is adjusted by periodically changing the current price based on the auction price change factor.

8. The method of claim 1 wherein the current price for an auction that is being carried out at any point in time is adjusted by incrementally reducing the current price by the auction price change factor.

9. The method of claim 1 wherein the current price for an auction that is being carried out at any point in time is adjusted by incrementally increasing the current price by the auction price change factor.

10. The method of claim 1 further including (i) initiating a plurality of auctions for a group of related lots, and (ii) adjusting the current price for an ongoing auction based on the outcome of one or more previously completed auctions.

11. The method of claim 10 wherein the previously completed auctions relate to lots similar in at least one characteristic to lot in the ongoing auction and the previously completed auctions are selected because their outcomes may indicate a trend in the demand for the lot in the ongoing auction.

12. The method of claim 1 wherein, in (d), the first current price is progressively reduced and wherein, if the first auction ends when the first current price reaches the first reserve price, then the second starting price is lower than the first starting price.

13. The method of claim 12 wherein the second auction has a second reserve price and wherein the second reserve price is lower than the first reserve price.

14. The method of claim 1 further comprising:
    (x) after (d) and before (e), continuing the first auction by receiving additional offers for the first lot during a first time period, wherein when an additional offer that meets a first predetermined condition in relation with the first current price is received, the first current price is changed to the value of the additional offer.

15. The method of claim 14 wherein during (d), the first current price is incrementally reduced and wherein the first predetermined condition is that the additional offer exceeds the first current price.

16. The method of claim 14 wherein during (d), the first current price is incrementally increased and wherein the first predetermined condition is that the additional offer is below the first current price.

17. The method of claim 14 further comprising:
    (y) after (e), during the second auction, incrementally changing the second current price by the auction price change factor until either (i) the second current price reaches a second reserve price or (ii) an offer is made for the second lot, wherein the offer is made from an auction interface coupled to the auction server through a communication network; and
    (z) after (y), continuing the second auction by receiving additional offers for the second lot during a second time period, wherein when an additional offer that meets a second predetermined condition in relation with the second current price is received, the second current price is changed to the value of the additional offer.

18. The method of claim 17 wherein during (y) the second current price is incrementally reduced and wherein the second predetermined condition is that the additional offer exceeds the second current price.

19. The method of claim 17 wherein during (y), the second current price is incrementally increased and wherein the second predetermined condition is that the additional offer is below the second current price.

* * * * *